United States Patent
Choi et al.

(10) Patent No.: US 11,789,574 B2
(45) Date of Patent: Oct. 17, 2023

(54) LIGHT EMITTING DISPLAY APPARATUS

(71) Applicant: LG DISPLAY CO., LTD, Seoul (KR)

(72) Inventors: Youngjun Choi, Paju-si (KR); SangWook Lee, Paju-si (KR); Yongseon Shin, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/539,773

(22) Filed: Dec. 1, 2021

(65) Prior Publication Data

US 2022/0197441 A1 Jun. 23, 2022

(30) Foreign Application Priority Data

Dec. 23, 2020 (KR) .................. 10-2020-0182238

(51) Int. Cl.
*G06F 3/044* (2006.01)
*G06F 3/041* (2006.01)

(52) U.S. Cl.
CPC ........ *G06F 3/0446* (2019.05); *G06F 3/04164* (2019.05); *G06F 3/04166* (2019.05); *G06F 2203/04104* (2013.01)

(58) Field of Classification Search
CPC ............... G06F 3/0446; G06F 3/04166; G06F 3/04164; G06F 2203/04104

USPC ......................................................... 345/174
See application file for complete search history.

(56) References Cited

U.S. PATENT DOCUMENTS

| | | | |
|---|---|---|---|
| 2015/0170610 A1* | 6/2015 | Kurasawa | G06F 3/0445 345/174 |
| 2017/0185184 A1* | 6/2017 | Kim | G06F 3/04166 |
| 2019/0155430 A1* | 5/2019 | Hwang | G06F 3/0448 |
| 2021/0191575 A1* | 6/2021 | Kim | G06F 3/0418 |

FOREIGN PATENT DOCUMENTS

| | | |
|---|---|---|
| KR | 2015-0070664 A | 6/2015 |
| KR | 2017-0081071 A | 7/2017 |

* cited by examiner

*Primary Examiner* — Mark Edwards
(74) *Attorney, Agent, or Firm* — POLSINELLI PC

(57) ABSTRACT

A light emitting display apparatus is provided, in which at least two touch electrodes are connected with a touch driver through a single touch line and their areas are different from each other, and the light emitting display apparatus comprises a substrate, touch electrodes provided on the substrate, touch lines provided on the substrate, a cover layer covering the touch electrodes and the touch lines, a light emitting driving layer provided on an upper end of the cover layer, and a touch driver connected with the touch lines, wherein at least two touch electrodes are connected to one touch line, and areas of at least two touch electrodes connected to one touch line are different from each other.

14 Claims, 22 Drawing Sheets

LIGHT EMITTING DISPLAY APPARATUS

CROSS-REFERENCE TO RELATED APPLICATION

This application claims the priority of the Korean Patent Application No. 10-2020-0182238 filed on Dec. 23, 2020, which is hereby incorporated by reference in its entirety as if fully set forth herein.

BACKGROUND

Field of the Disclosure

The present disclosure relates to a light emitting display apparatus. Although the present disclosure is suitable for a wide scope of applications, it is particularly suitable for reducing parasitic capacitance between electrodes provided in the light emitting display panel and the touch lines and increasing an aperture ratio of the light emitting display panel by reducing the number of the touch lines.

Description of the Background

A light emitting display apparatus is an apparatus for outputting light by using a light emitting element, and includes a light emitting display panel provided with light emitting elements.

Touch electrodes may be embedded in the light emitting display apparatus, and each of the touch electrodes is connected to a touch driver through a touch line. In this case, when the number of touch electrodes is increased, the number of touch lines is also increased.

As the number of touch lines is increased, parasitic capacitance between electrodes provided in the light emitting display panel and the touch lines is increased. Thus, quality of the light emitting display apparatus can be deteriorated. Also, as the number of touch lines is increased, an aperture ratio of the light emitting display panel can be reduced.

SUMMARY

Accordingly, the present disclosure has been made in view of the above problems and the present disclosure is to provide a light emitting display apparatus in which at least two touch electrodes are connected with a touch driver through a single touch line and their areas are different from each other.

In addition, the present disclosure as mentioned above and additional features of the present disclosure will be clearly understood by those skilled in the art from the following description of the present disclosure.

In accordance with an aspect of the present disclosure, the above and other features can be accomplished by the provision of a light emitting display apparatus comprising a substrate, touch electrodes provided on the substrate, touch lines provided on the substrate, a cover layer covering the touch electrodes and the touch lines, a light emitting driving layer provided on an upper end of the cover layer, and a touch driver connected with the touch lines, wherein at least two touch electrodes are connected to one touch line, and areas of at least two touch electrodes connected to one touch line are different from each other.

BRIEF DESCRIPTION OF THE DRAWINGS

The above and other features and advantages of the present disclosure will be more clearly understood from the following detailed description taken in conjunction with the accompanying drawings, in which.

DETAILED DESCRIPTION

Figure 1:
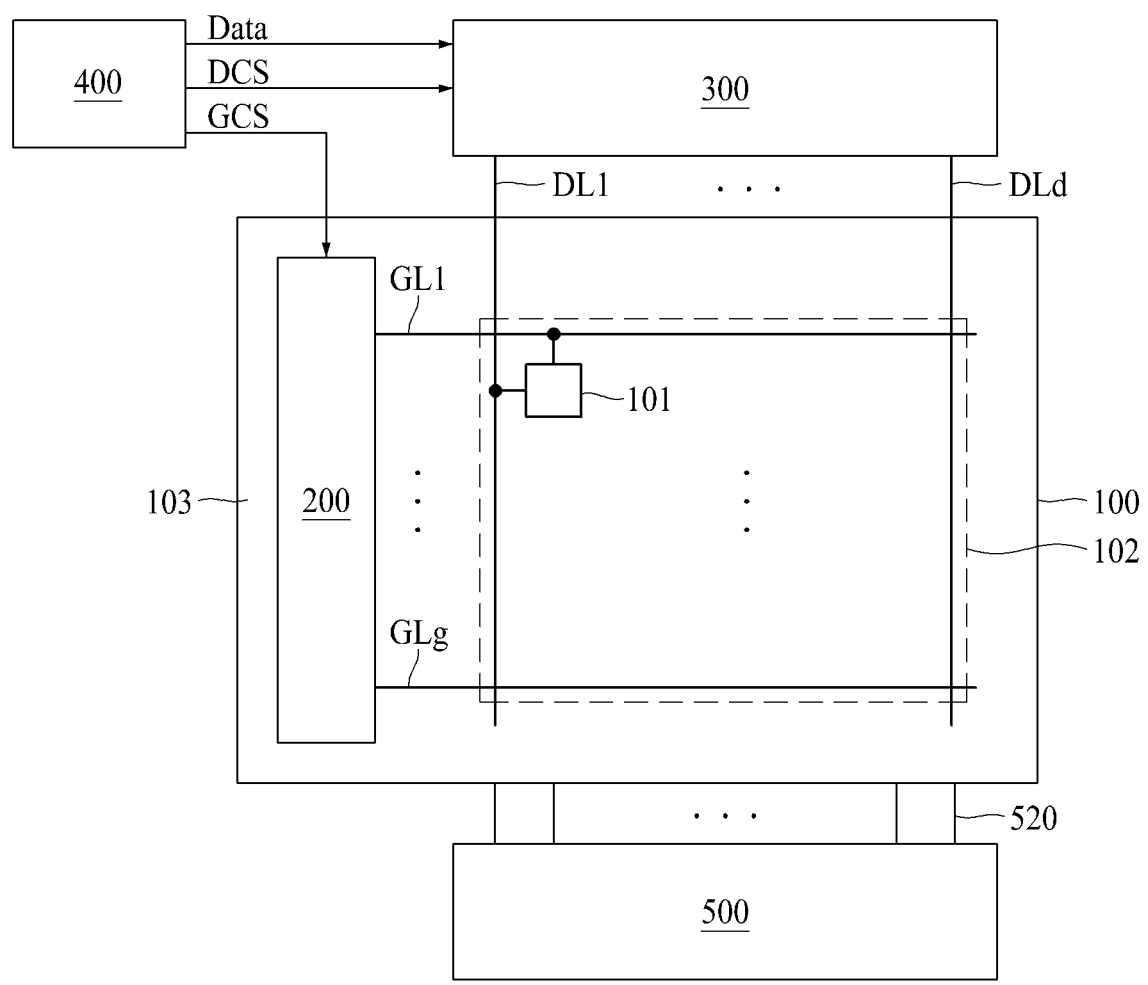
FIG. 1 is an exemplary view illustrating a structure of a light emitting display apparatus.

Advantages and features of the present disclosure and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete and will fully convey the scope of the present disclosure to those skilled in the art. Further, the present disclosure is only defined by scopes of claims.

In the drawings, the same or similar elements are denoted by the same reference numerals even though they are depicted in different drawings. Wherever possible, the same reference numbers will be used throughout the drawings to refer to the same or like parts.

A shape, a size, a ratio, an angle and a number disclosed in the drawings for describing aspects of the present disclosure are merely an example and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted. In a case where 'comprise', 'have' and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when the position relationship is described as 'upon~', 'above~', 'below~' and 'next to~', one or more portions may be arranged between two other portions unless 'just' or 'direct' is used.

In describing a temporal relationship, for example, when the temporal order is described as 'after~', 'subsequent~', 'next~' and 'before~', a case which is not continuous may be included unless 'just' or 'direct' is used.

It should be understood that the term "at least one" includes all combinations related with any one item. For example, "at least one among a first element, a second element and a third element" may include all combinations of two or more elements selected from the first, second and third elements as well as each element of the first, second and third elements.

It will be understood that, although the terms "first," "second," etc. may be used herein to describe various elements, these elements should not be limited by these terms. These terms are only used to distinguish one element from another. For example, a first element could be termed a second element and, similarly, a second element could be termed a first element, without departing from the scope of the present disclosure.

Features of various aspects of the present disclosure may be partially or overall coupled to or combined with each other and may be variously inter-operated with each other and driven technically as those skilled in the art can sufficiently understand. The aspects of the present disclosure may be carried out independently from each other or may be carried out together in co-dependent relationship.

Hereinafter, the aspect of the present disclosure will be described in detail with reference to the accompanying drawings.

Figure 2:
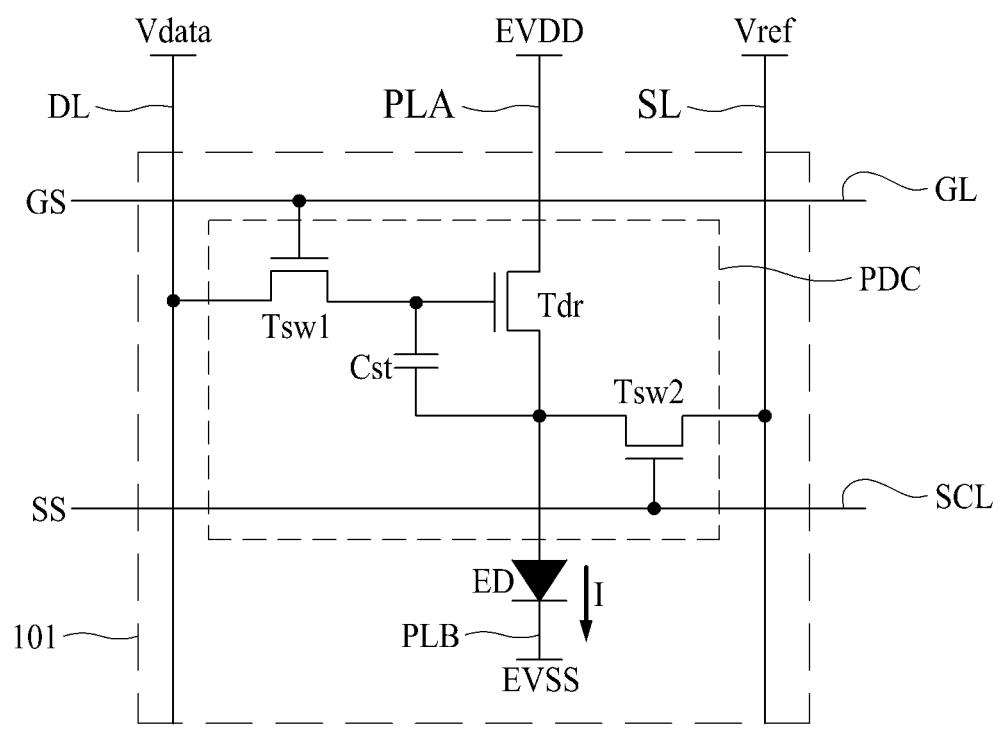
FIG. 2 is an exemplary view illustrating a structure of a pixel applied to a light emitting display apparatus according to the present disclosure.
Figure 3:
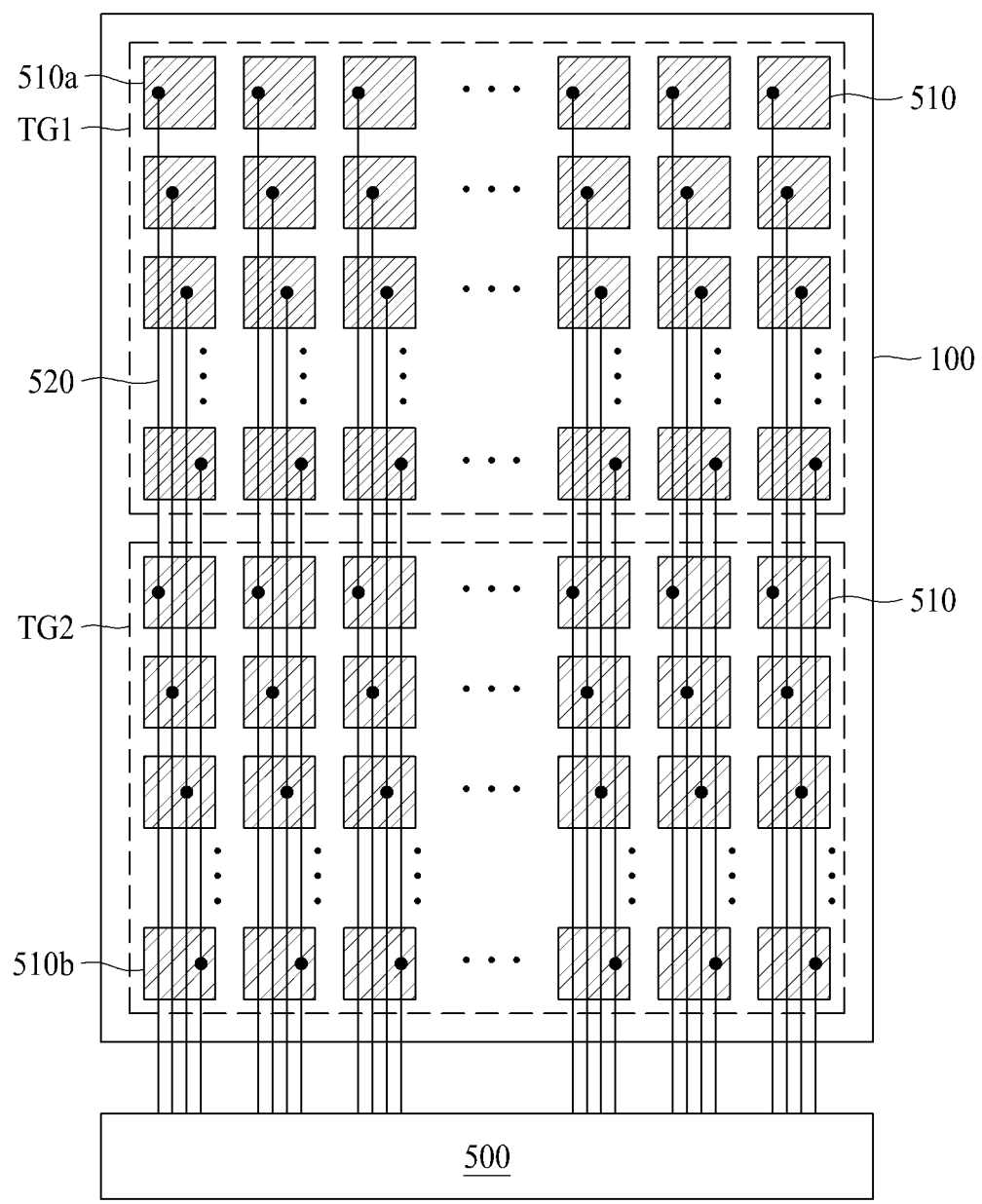
FIG. 3 is an exemplary view illustrating touch electrodes and touch lines applied to a light emitting display apparatus according to the present disclosure.

FIG. 1 is an exemplary view illustrating a structure of a light emitting display apparatus, FIG. 2 is an exemplary view illustrating a pixel structure of a light emitting display apparatus according to the present disclosure, and FIG. 3 is an exemplary view illustrating touch electrodes and touch lines of a light emitting display apparatus according to the present disclosure.

The light emitting display apparatus according to the present disclosure may constitute various electronic devices. The electronic device may be, for example, a smart phone, a tablet PC, a television, a monitor, or the like.

As shown in FIGS. 1 to 3, the light emitting display apparatus according to the present disclosure includes a light emitting display panel 100 provided with pixels 101 to display an image, a data driver 300 for supplying data voltages Vdata to data lines DL1 to DLd provided in the light emitting display panel 100, a gate driver 200 for supplying gate voltages to gate lines GL1 to GLg provided in the light emitting display panel 100, a touch driver 500 connected with touch electrodes 510 provided in the light emitting display panel 100 through touch lines 520, and a controller 400 for controlling the data driver 300, the gate driver 200 and the touch driver 500, wherein g, d and k are natural numbers.

The light emitting display panel 100 may include a display area 102 and a non-display area 103. The display area 102 is provided with gate lines GL1 to GLg, data lines DL1 to DLd, voltage supply lines PLA, pixels 101, touch electrodes 510 and touch lines 520.

The display area 102 outputs an image and the non-display area 103 surrounds the display area 102. The non-display area 103 does not output an image.

As shown in FIG. 2, the pixel 101 provided in the light emitting display panel 100 may include a light emitting element ED, a switching transistor Tsw1, a storage capacitor Cst, a driving transistor Tdr, and a sensing transistor Tsw2. That is, the pixel 101 may include a pixel driving unit PDU and a light emitting unit. The pixel driving unit PDU may include a switching transistor Tsw1, a capacitor Cst, a driving transistor Tdr and a sensing transistor Tsw2, and the light emitting unit may include a light emitting element ED.

Brightness of light may be controlled in accordance with a magnitude of a current I flowing in the light emitting element ED, the magnitude of the current I flowing in the light emitting element ED may be controlled by the driving transistor Tdr, and the driving transistor Tdr may be controlled by the data voltage Vdata.

The light emitting element ED may include one of an organic light emitting layer, an inorganic light emitting layer and a quantum dot light emitting layer, or may include a deposited or mixed structure of an organic light emitting layer (or inorganic light emitting layer) and a quantum dot light emitting layer.

Also, the light emitting element ED may emit light corresponding to one of various colors such as red, green and blue colors, or may emit white light.

The switching transistor Tsw1 constituting the pixel driving unit PDU is turned on or off by a gate signal GS supplied to the gate line GL, and the data voltage Vdata supplied through the data line DL is supplied to the driving transistor Tdr when the switching transistor Tsw1 is turned on.

A first voltage EVDD is supplied to the driving transistor Tdr and the light emitting element ED through the voltage supply line PLA, and a second voltage EVSS is supplied to the light emitting element ED through a voltage line PLB. The voltage supply line PLA and the voltage line PLB may be connected with a power supply unit through the data driver 300 or the gate driver 200, or may directly be connected with the power supply unit.

The sensing transistor Tsw2 is turned on or off by a sensing control signal SS supplied through a sensing control line SCL, and a sensing line SL may be connected to the sensing transistor Tsw2.

A reference voltage Vref may be supplied to the pixel 101 through the sensing line SL, and a sensing signal related to a characteristic change of the driving transistor Tdr may be transmitted to the sensing line SL through the sensing transistor Tsw2.

The pixel 101 applied to the present disclosure may be formed in the structure shown in FIG. 2, but the present disclosure is not limited thereto. Therefore, the pixel applied to the present disclosure may be changed in various forms in addition to the structure shown in FIG. 2.

Next, the controller 400 includes a data aligner for realigning input image data transmitted from an external system using a timing synchronization signal transmitted from the external system and supplying the realigned image data Data to the data driver 300, a control signal generator for generating a gate control signal GCS and a data control signal DCS using the timing synchronization signal, an input unit for receiving the timing synchronization signal and the input image data transmitted from the external system and transmitting them to the data aligner and the control signal generator, and an output unit for outputting the image data Data generated from the data aligner and the control signals DCS and GCS generated from the control signal generator to the data driver 300 or the gate driver 200.

The control signal generator may generate a touch control signal for controlling the touch driver 500. That is, the touch driver 500 may be driven under the control of the controller 400.

The data driver 300 may be provided in a chip-on film attached to the light emitting display panel 100, and may also be connected to a main substrate provided with the controller 400. In this case, lines for electrically connecting the controller 400, the data driver 300 and the light emitting display panel 100 are provided in the chip-on-film. To this end, the lines are electrically connected to pads provided in the main substrate and the light emitting display panel 100. The main substrate is electrically connected with an external substrate on which the external system is mounted.

The data driver 300 may be directly mounted on the light emitting display panel 100 and then electrically connected with the main substrate.

However, the data driver 300 may be formed as one integrated circuit together with the controller 400, wherein the integrated circuit may be provided in the chip-on film or directly mounted on the light emitting display panel 100.

The data driver 300 converts the image data Data input from the controller 400 into the data voltages Vdata and supplies the data voltages Vdata of one horizontal line to the data lines DL1 to DLd every one horizontal period in which a gate pulse is supplied to the gate line GL. For example, the data driver 300 converts the image data Data into the data voltages Vdata using gamma voltages supplied from a gamma voltage generator, and outputs the data voltages Vdata to the data lines DL1 to DLd for an image output period.

In this case, the horizontal line refers to a virtual line formed along the gate line GL. In the horizontal line, pixels connected with the gate line GL are disposed in a row. That is, the horizontal line refers to a virtual line corresponding to the gate line GL.

Then, the gate driver 200 may be provided as an integrated circuit and then mounted on the non-display area 103, or may directly be embedded in the non-display area 103 using a gate-in-panel (GIP) scheme. When the gate-in-panel scheme is used, the transistors constituting the gate driver 200 may be provided in the non-display area 103 through the same process as that of the transistors provided in the respective pixels 101 of the display area 102.

When the gate pulse generated by the gate driver 200 is supplied to a gate of the switching transistor Tsw1 provided in the pixel 101, the switching transistor Tsw1 is turned on. When a gate-off signal is supplied to the switching transistor Tsw1, the switching transistor Tsw1 is turned off. The gate signal GS supplied to the gate line GL includes a gate pulse and a gate-off signal.

The external system serves to drive the controller 400 and the electronic device. That is, when the electronic device is a smart phone, the external system receives various kinds of voice information, image information and text information through a wireless communication network and transmits the received image information to the controller 400. The image information may be the input image data.

The touch driver 500 may determine one of at least two touch electrodes, to which a touch signal is supplied, and may determine whether there is a touch on the corresponding touch electrode, by using a size of the touch signal transmitted through the touch line 520.

For example, as shown in FIG. 3, the light emitting display panel 100 may include touch electrodes 510, and the touch electrodes 510 are connected with the touch driver 500 through the touch lines 520.

The touch driver 500 may determine whether there is a touch on the touch electrode 510, by using the touch signal received through the touch line 520, for example, a magnitude of a voltage.

For example, in the case that the touch driver 500 supplies a voltage of 2 V to the touch electrode 510 through the touch line 520, a voltage of 1.9 V may be supplied to the touch driver 500 through the touch line 520 if there is no touch on the touch electrode 510, and a voltage of 2.5 V may be supplied to the touch driver 500 through the touch line 520 if there is a touch on the touch electrode 510.

Therefore, when 1.9 V is received, the touch driver 500 may determine that there is no touch by a user, and when 2.5 V is received, the touch driver 500 may determine that there is a touch by a user.

In this case, as described above, the voltage received by the touch driver 500 may be different depending on whether there is a touch, but the magnitude of the voltage received by the touch driver 500 may be different depending on an area of the touch electrode 510.

For example, since capacitance of a touch electrode 510a (hereinafter, simply referred to as a first touch electrode) having a large area and capacitance of a touch electrode 510b (hereinafter, simply referred to as a second touch electrode) having an area smaller than that of the first touch electrode 510a are different from each other, voltages of touch signals received from the first touch electrode 510a and the second touch electrode 510b may be different from each other when a voltage of 2 V is simultaneously supplied to the first touch electrode 510a and the second touch electrode 510b.

That is, when there is no touch, for example, a voltage of 1.7 V may be received from the first touch electrode 510a and a voltage of 1.9 V may be received from the second touch electrode 510b. In addition, when there is a touch, for example, a voltage of 2.2 V may be received from the first touch electrode 510a and a voltage of 2.5 V may be received from the second touch electrode 510b.

When the voltage of the received touch signal is 2.2 V, the touch driver 500 determines that there is a touch on the first touch electrode 510a, and when the voltage of the received touch signal is 2.5V, the touch driver 500 may determine that there is a touch on the second touch electrode 510b.

Also, the touch driver 500 may determine a touch electrode that there is a touch, by using a difference between a touch driving signal (2 V in the above example) supplied to the touch electrodes and the touch signal received from the touch electrodes. For example, the touch driver 500 may determine that there is a touch on the first touch electrode 510a when a voltage difference between the voltage of the touch driving signal and the voltage of the touch signal is −0.2 V (=2 V−2.2 V) in the above example, and may determine that there is a touch on the second touch electrode 510b when a voltage difference between the voltage of the touch driving signal and the voltage of the touch signal is −0.5 V (=2 V−2.5 V).

That is, as described above, since the size of the touch signal is varied depending on the area of the touch electrode, the touch driver 500 may determine one of at least two touch electrodes 510, to which the touch signal is supplied, and may determine whether there is a touch on the corresponding touch electrode, by using the size of the touch signal.

In addition, when the same touch driving voltage is supplied to the touch electrodes 510 having different areas, the sizes of the touch signals transmitted from the touch electrodes 510 having different areas are different from each other. This difference occurs because capacitances of the touch electrodes 510 having different areas are different from each other.

Various methods of allowing the touch driver 500 to determine one of at least two touch electrodes 510, to which the touch signal is supplied, and determine whether there is a touch on the corresponding touch electrode may be configured in consideration of various characteristics that vary depending on the areas of the touch electrodes, in addition to the method described above.

Also, in the present disclosure, as shown in FIG. 3, the touch electrodes 510, which are independently driven, are provided in the light emitting display panel 100. Therefore, when a touch separately occurs from two or more touch electrodes 510, that is, when a multi-touch occurs, the touch driver 500 may determine whether there is a touch on each of two or more touch electrodes 510, by using the above-described method.

For example, since the touch signals generated from the touch electrodes 510 connected to different touch lines 520 are received by the touch driver 500 through different touch lines 520, the touch driver 500 may simultaneously determine whether there is a touch on each of the touch electrodes 510 that are different from each other.

Also, when a touch occurs from the touch electrodes 510 connected to one touch line 520 at the same time, the touch driver 500 may determine whether there is a touch on at least one of at least two touch electrodes 510 connected to one touch line 520, depending on the size of the touch signal received from one touch line 520.

For example, as described above, the capacitance of the first touch electrode 510a having a large area and the capacitance of the second touch electrode 510b having an area smaller than that of the first touch electrode 510a are different from each other. Therefore, when the voltage of 2 V is simultaneously supplied to the first touch electrode 510a and the second touch electrode 510b, the size of the touch signal received from the first touch electrode 510a, the size of the touch signal received from the second touch electrode 510b and the size of the touch signal simultaneously received from the first touch electrode 510a and the second touch electrode 510b are different from one another. Therefore, the touch driver 500 may analyze the size of the received touch signal to determine whether a touch has occurred in the first touch electrode 510a or whether a touch has occurred in the second touch electrode 510b or whether a touch has occurred in both the first touch electrode 510a and the second touch electrode 510b.

Hereinafter, various methods of connecting at least two touch electrodes 510 having different areas to one touch line 520 will be described with reference to FIGS. 3 to 8C.

Figure 4A:
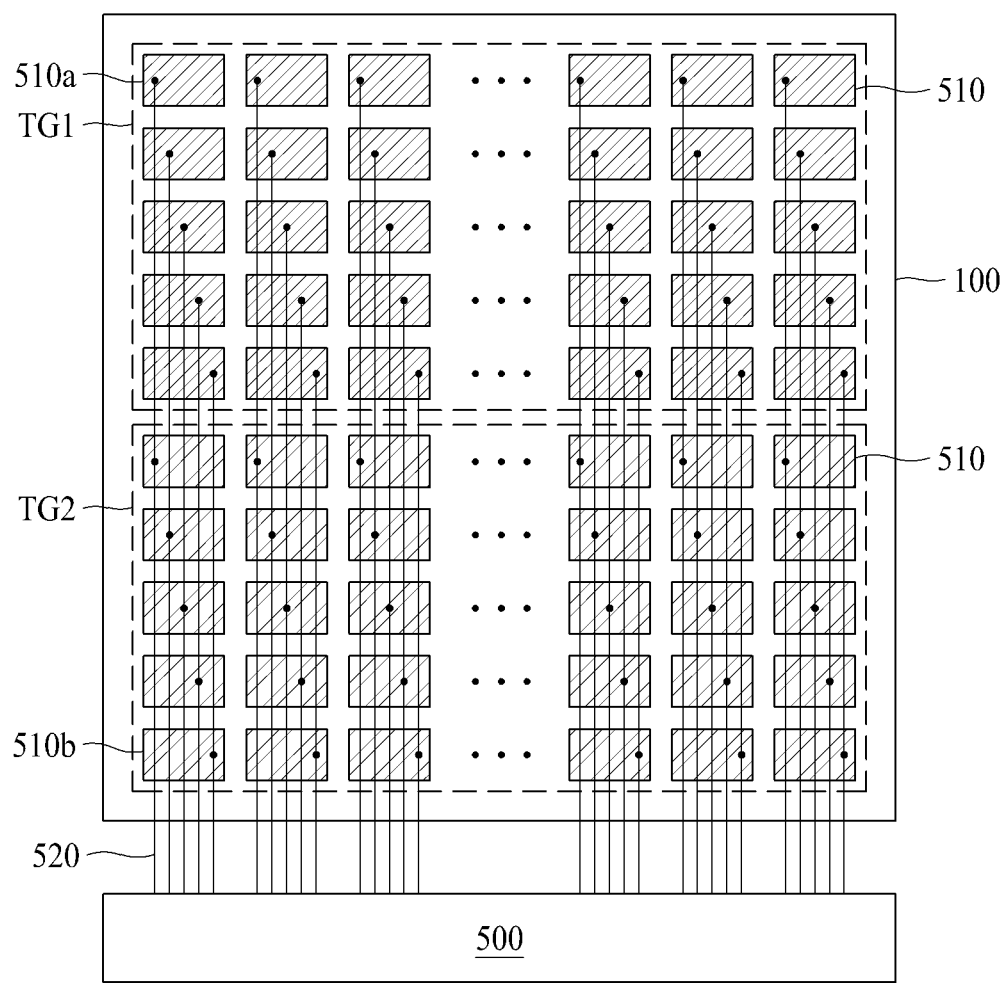
FIGS. 4A to 4C, 5A to 5D, 6A to 6C, 7A to 7D and 8A to 8C are various exemplary view illustrating a connection relation of touch electrodes and touch lines provided in a light emitting display panel applied to a light emitting display apparatus according to the present disclosure.
Figure 6A:
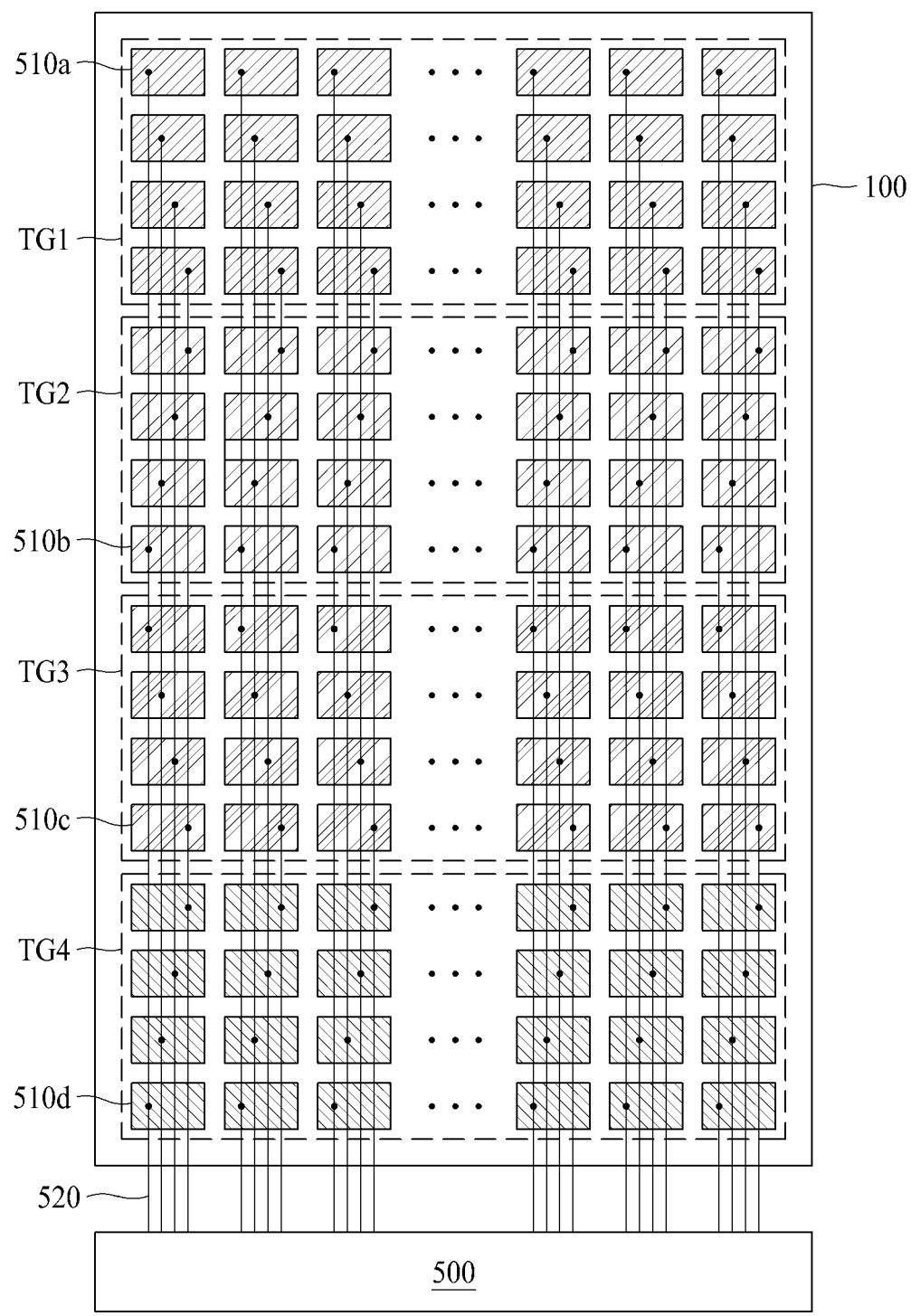
Figure 6B:
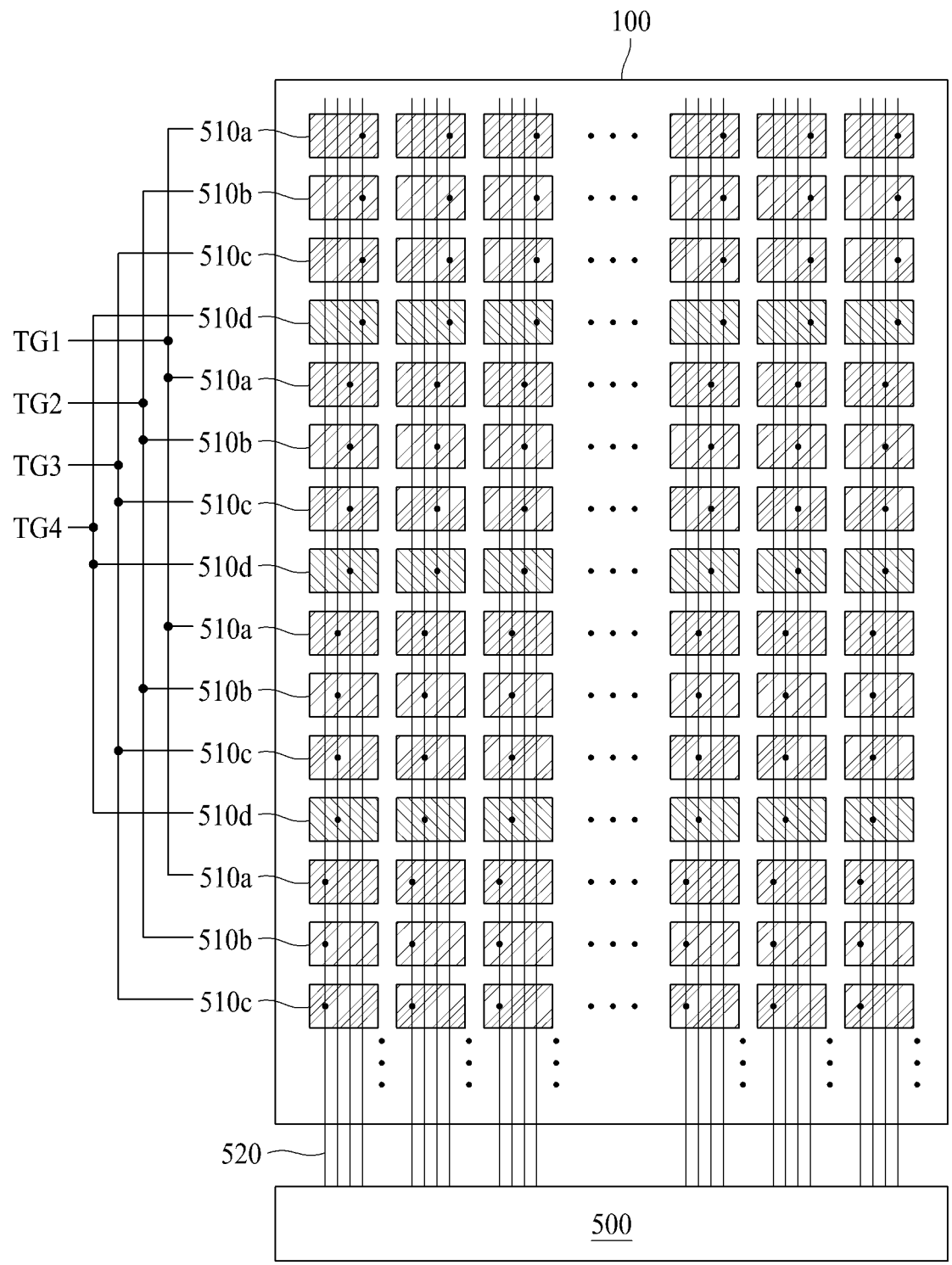
Figure 6C:
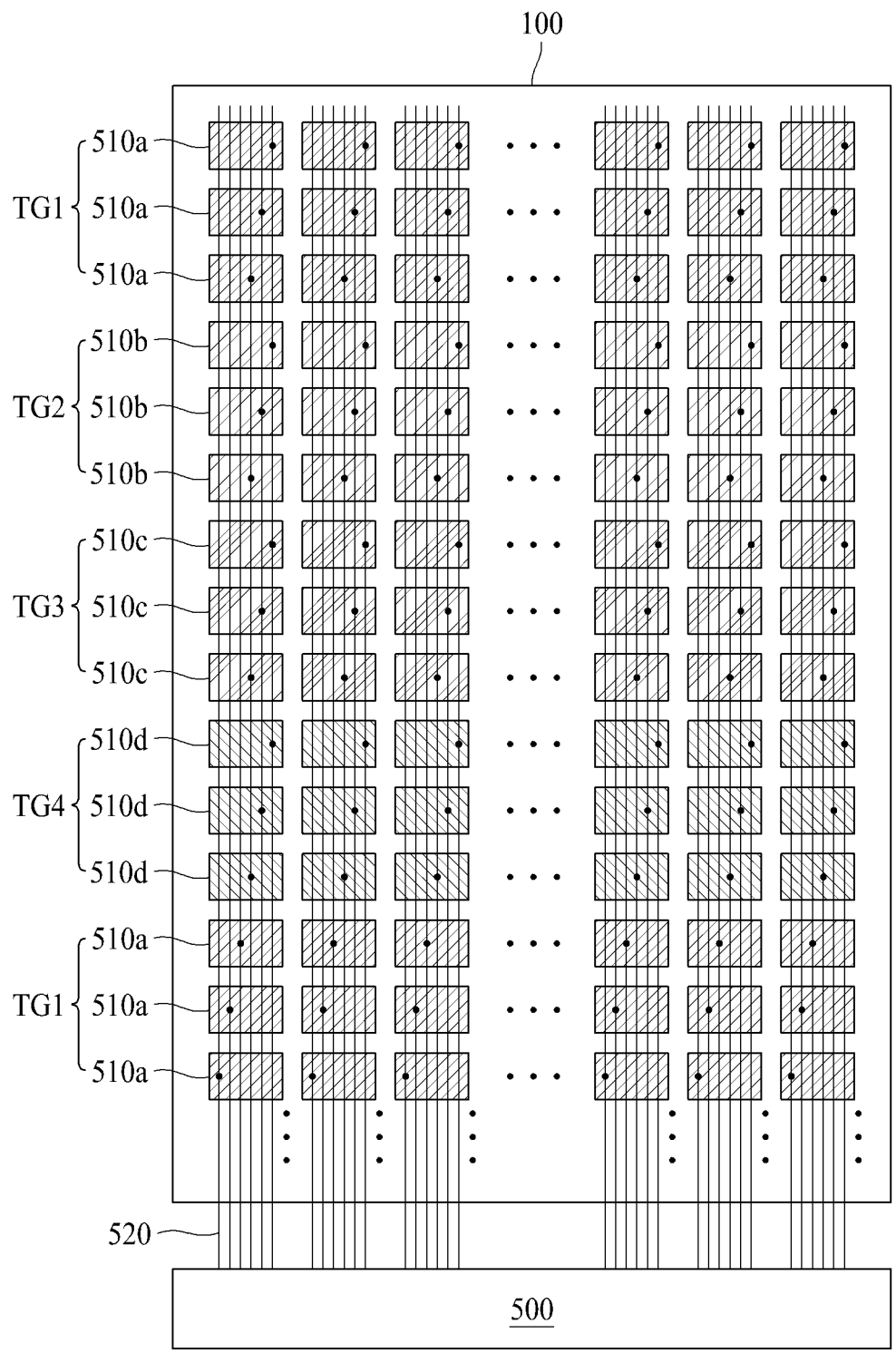
Figure 7A:
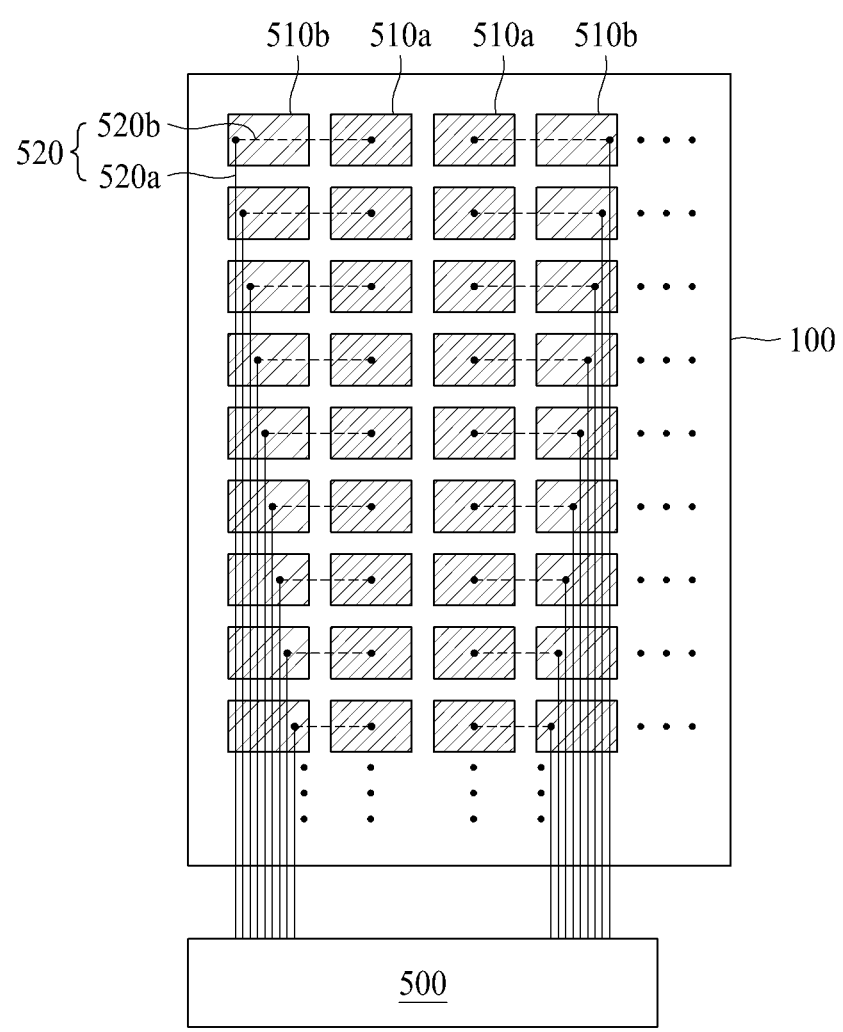
Figure 7B:
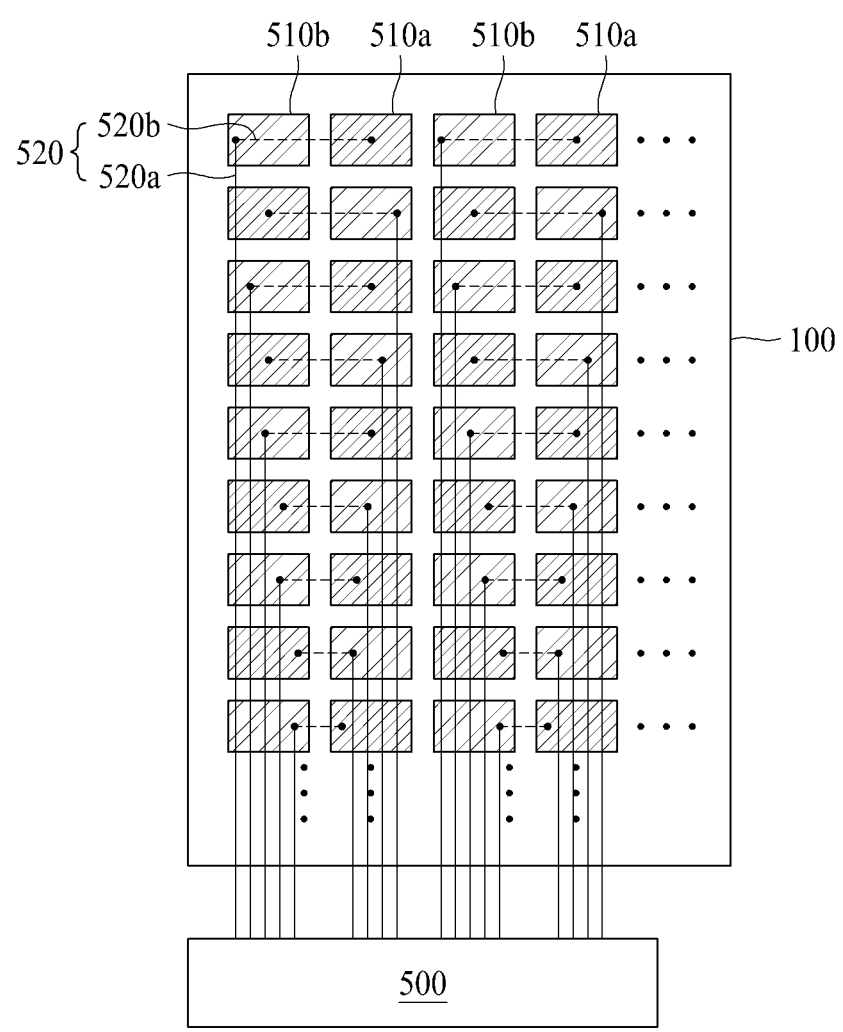
Figure 7C:
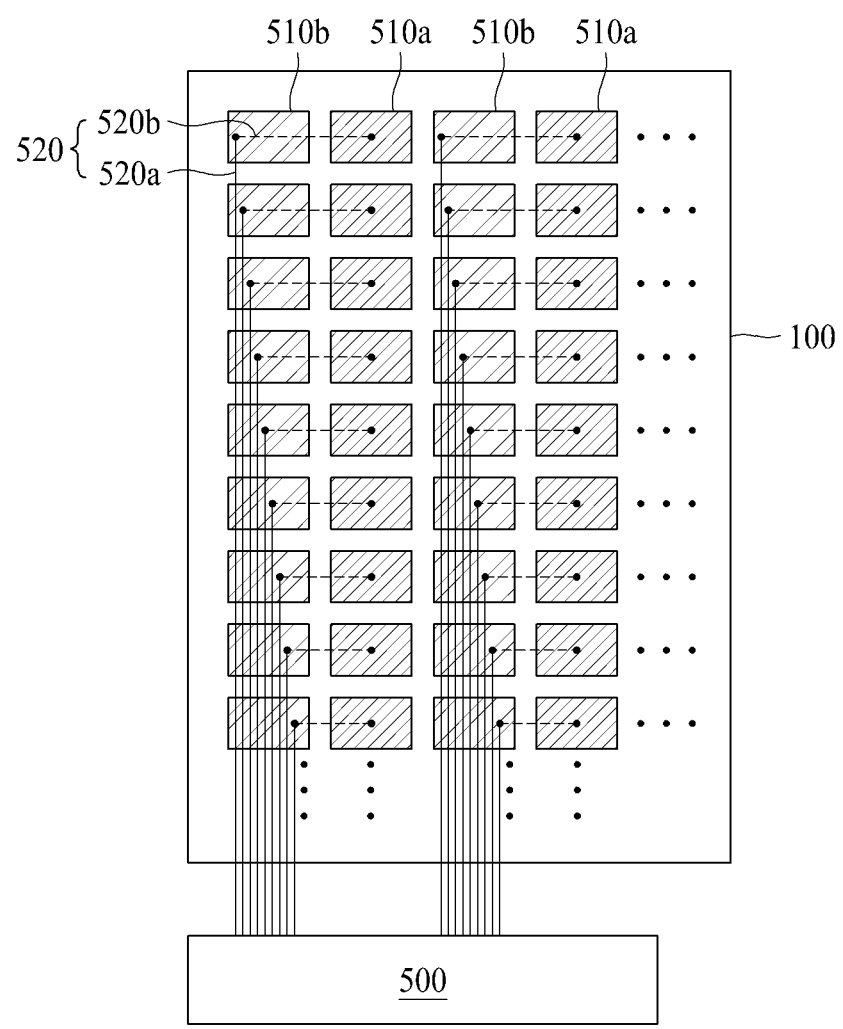
Figure 7D:
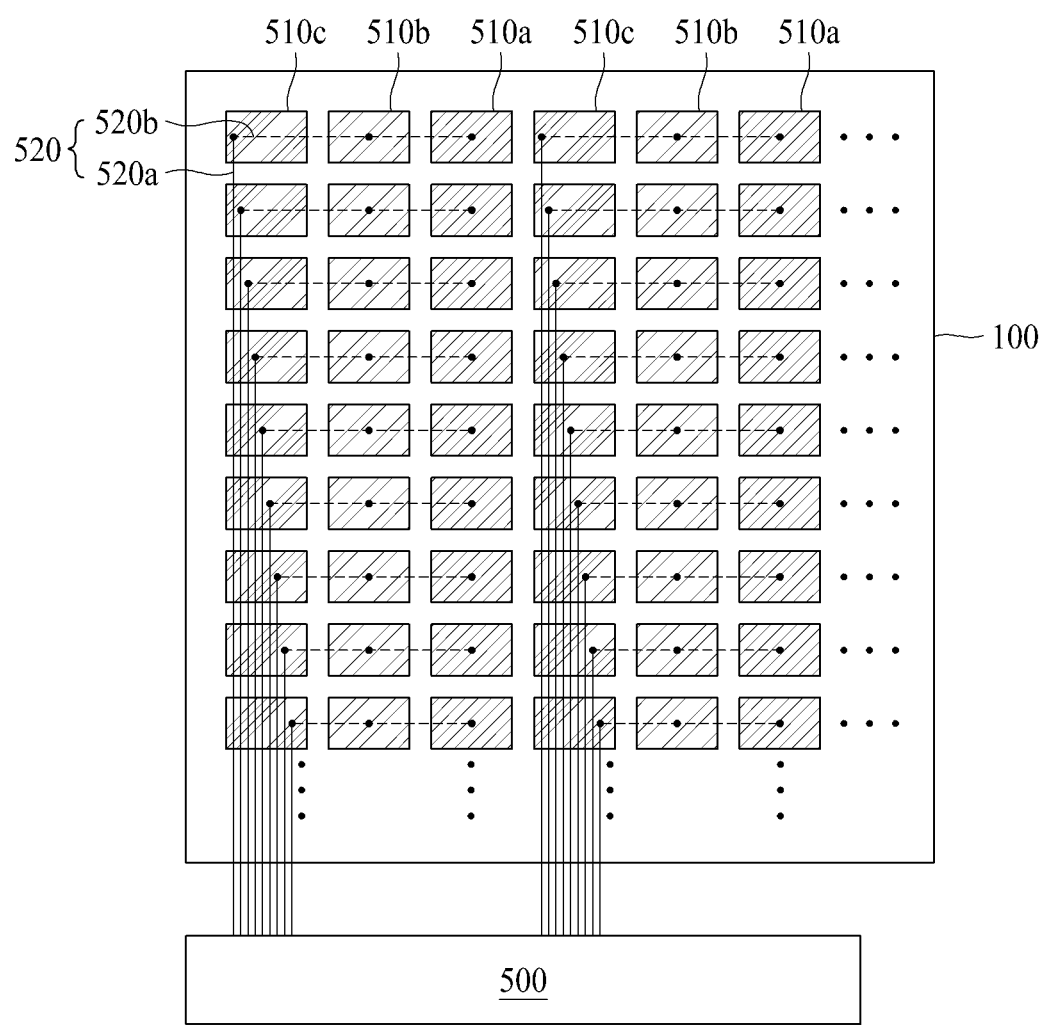
Figure 8A:
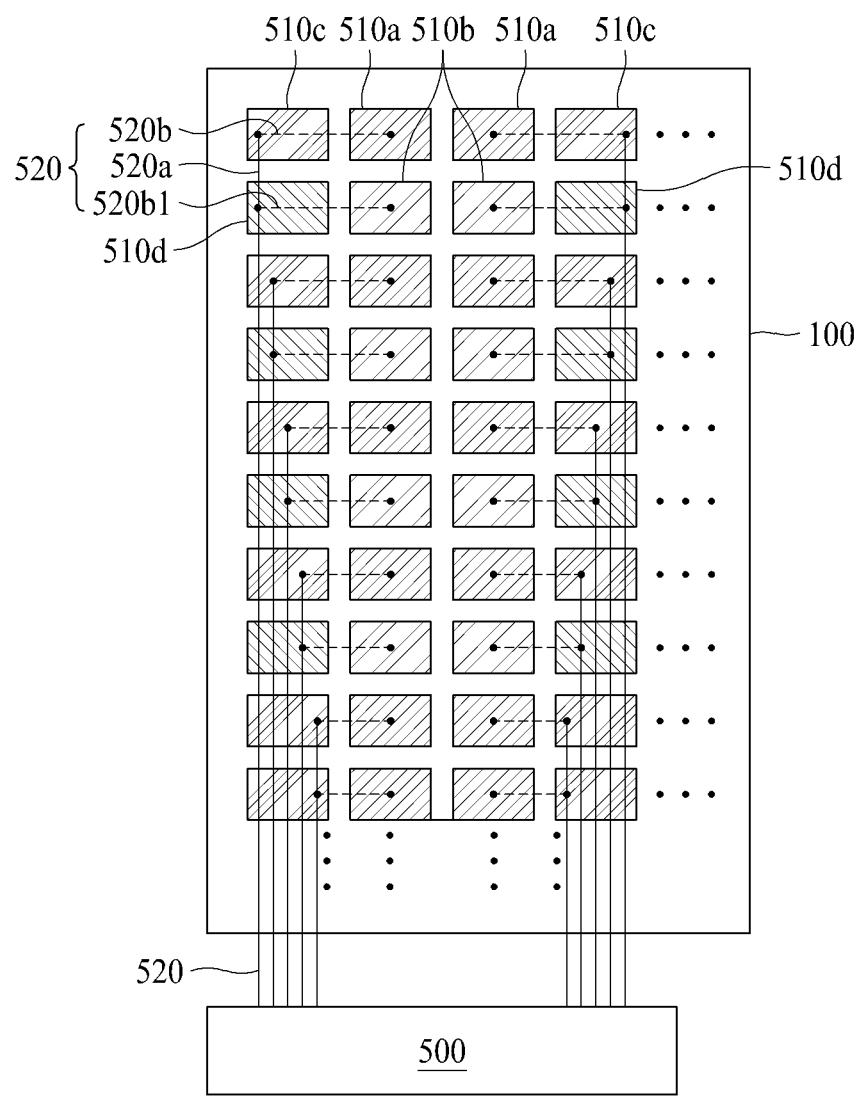
Figure 8B:
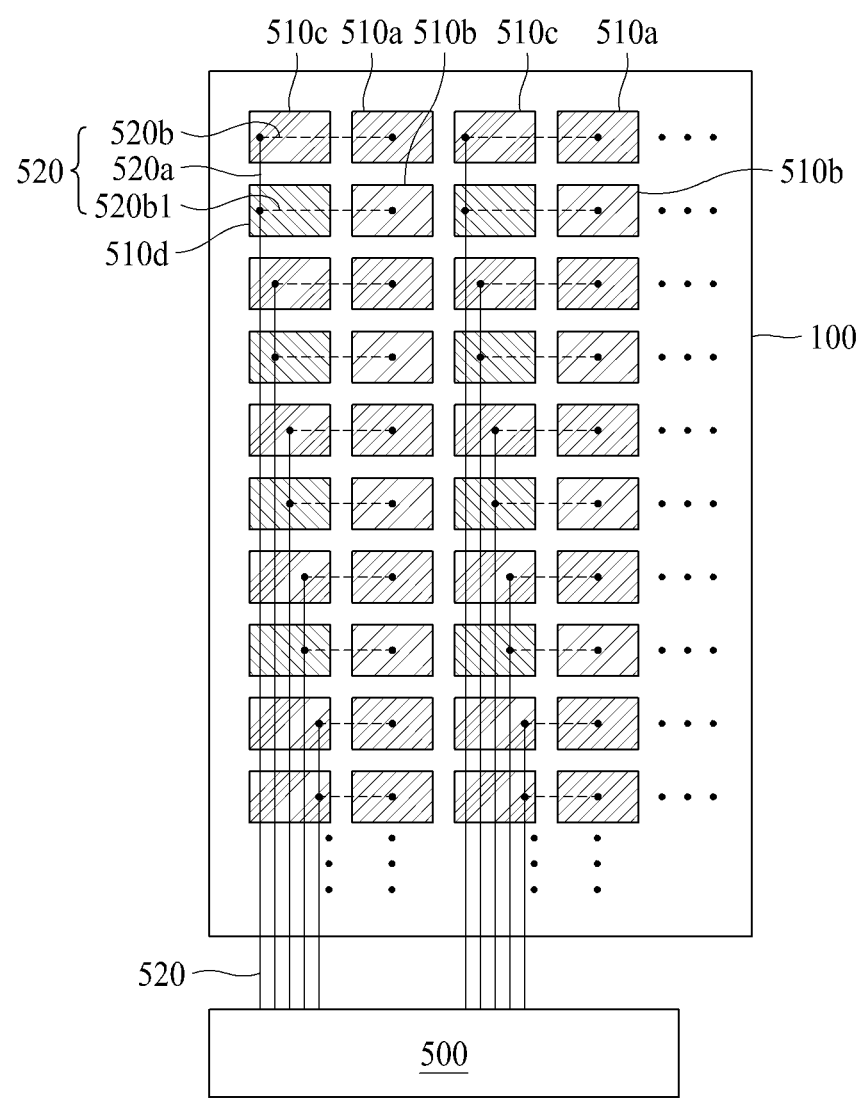
Figure 8C:
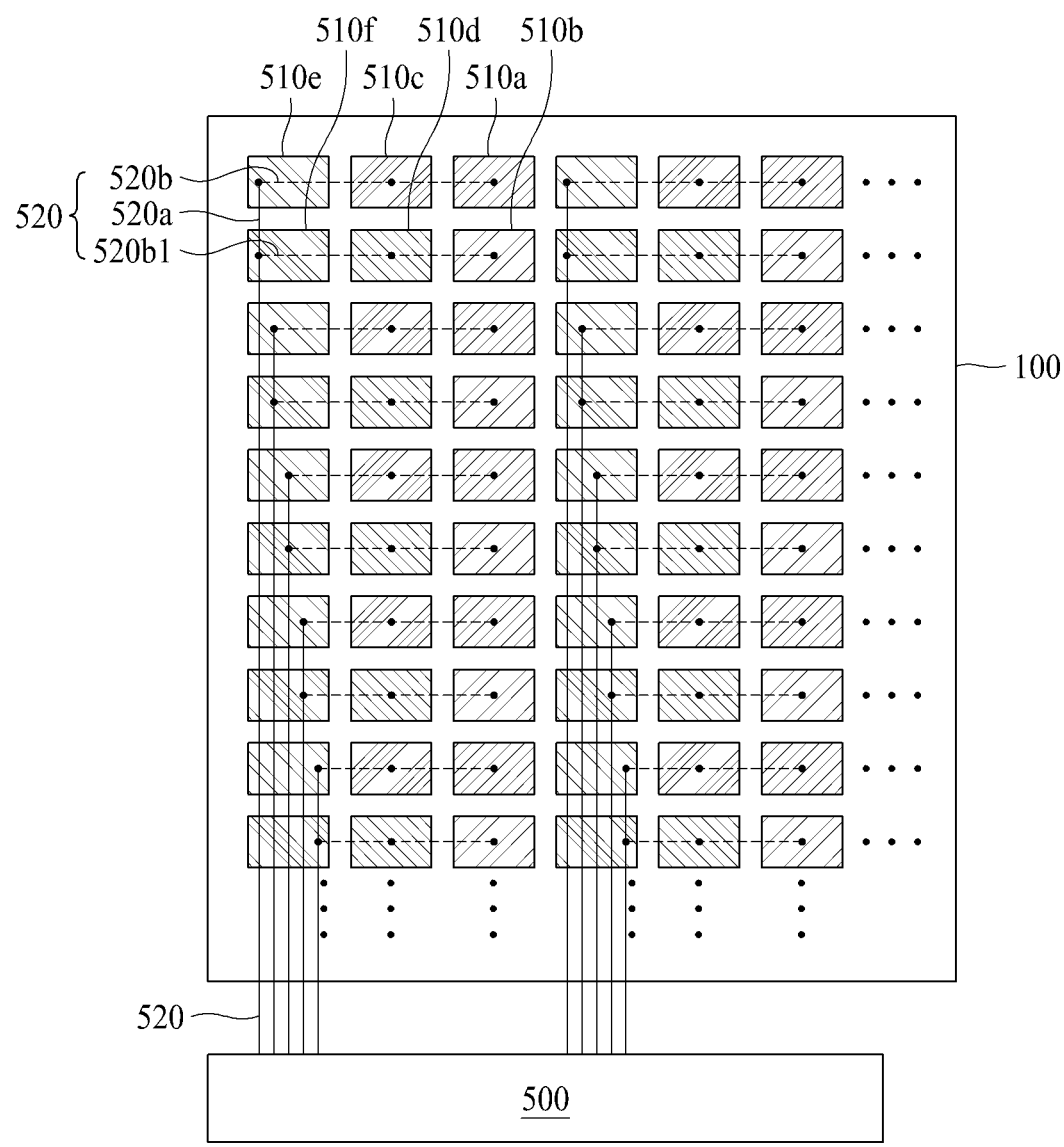

FIGS. 4A to 8C are various exemplary view illustrating a connection relation of touch electrodes and touch lines provided in a light emitting display panel applied to a light emitting display apparatus according to the present disclosure. FIGS. 4A to 4C illustrate touch electrodes divided into two touch groups, FIGS. 5A to 5D illustrate touch electrodes divided into three touch groups, FIGS. 6A to 6C illustrate touch electrodes divided into four touch groups, and FIGS. 7A to 7D illustrates a light emitting display panel in which two touch electrodes having different areas adjacent to each other in a second direction (e.g., horizontal direction of the light emitting display panel) of the light emitting display panel are connected with each other, and FIGS. 8A to 8C illustrate a light emitting display panel in which four touch electrodes adjacent to one another in a first direction (e.g., vertical direction of the light emitting display panel) and a second direction with different areas are connected to one another.

In the following description, in case of the description related to features commonly applied to all of the touch electrodes provided in the light emitting display panel, a reference numeral 510 is applied to the touch electrode, and in the case that the touch electrodes should be divided depending on an area, reference numerals 510a and 510b are applied to the touch electrode. That is, an area of the touch electrode described with the reference numeral 510a and an area of the touch electrode described with the reference numeral 510b are different from each other.

As described above, the light emitting display apparatus according to the present disclosure includes a light emitting display panel 100, a gate driver 200, a data driver 300, a controller 400 and a touch driver 500.

The light emitting display panel 100 may include a substrate, touch electrodes 510 provided on the substrate and touch lines 520 provided on the substrate. That is, the touch electrodes 510 and the touch lines 520 are provided on the substrate.

Initially referring to FIG. 4A, in the light emitting display panel shown in FIG. 4A, at least two touch electrodes 510 are connected to one touch line 520, and a first touch group TG1 including touch electrodes having the same area as that of the first touch electrode 510a of at least two touch electrodes 510 and a second touch group TG2 including touch electrodes having the same area as that of the second touch electrode 510b of at least two touch electrodes are separated from each other along a first direction of the substrate, and the touch line 520 is provided along the first direction. In this case, the first direction may be, for example, a vertical direction of the light emitting display panel shown in FIG. 4A. The second direction of the substrate may be a direction different from the first direction, and for example, may be a horizontal direction of the light emitting display panel 100 shown in FIG. 4A. In this case, the light emitting display panel shown in FIG. 3 and the light emitting display panel 100 shown in FIG. 4A have the same structure.

Particularly, in the light emitting display panel shown in FIG. 4A, two touch electrodes 510 are connected to one touch line 520.

The first touch group TG1 including touch electrodes having the same area as that of the first touch electrode 510a of the two touch electrodes 510 and the second touch group TG2 including touch electrodes having the same area as that of the second touch electrode 510b of the two touch electrodes 510 are separated from each other along the first direction of the substrate.

That is, the first touch group TG1 is provided on an upper end of the light emitting display panel 100 shown in FIG. 4A, and the second touch group TG2 is provided on a lower end of the light emitting display panel 100 shown in FIG. 4A.

Figure 4B:
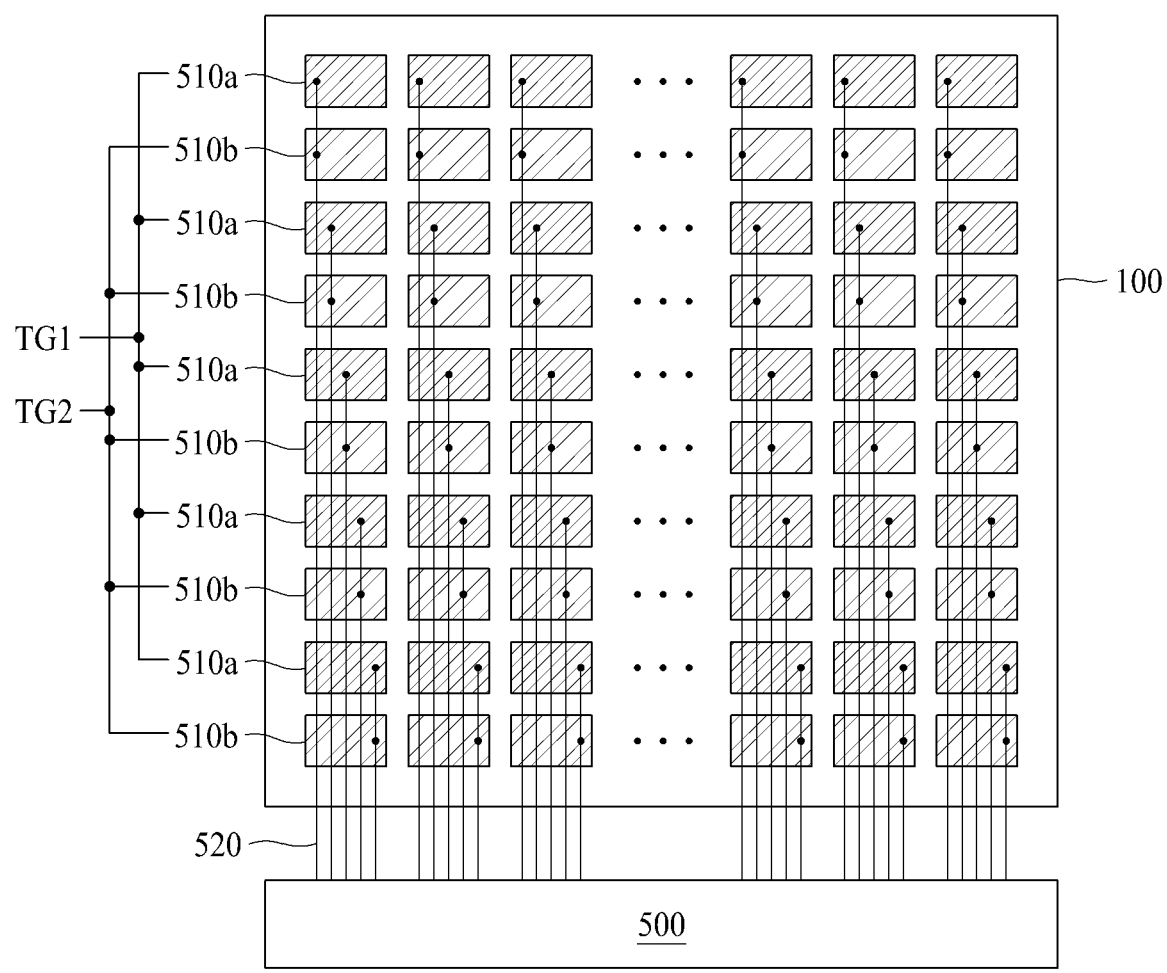

Next, in the light emitting display panel shown in FIG. 4B, at least two touch electrodes 510 are connected to one touch line 520, touch electrodes having the same area as that of the first touch electrode 510a of at least two touch electrodes and touch electrodes having the same area as that of the second touch electrode 510b of at least two touch electrodes 510 are alternately provided along the first direction of the substrate.

In particular, in the light emitting display panel shown in FIG. 4B, two touch electrodes 510 are connected to one touch line 520, and the first touch electrode 510a provided in the first touch group TG1 and the second touch electrode 510b provided in the second touch group TG2 are alternately provided along the first direction.

In this case, the first touch electrode 510a and the second touch electrode 510b, which are adjacent to each other along the first direction, are connected to one touch line 520.

Figure 4C:
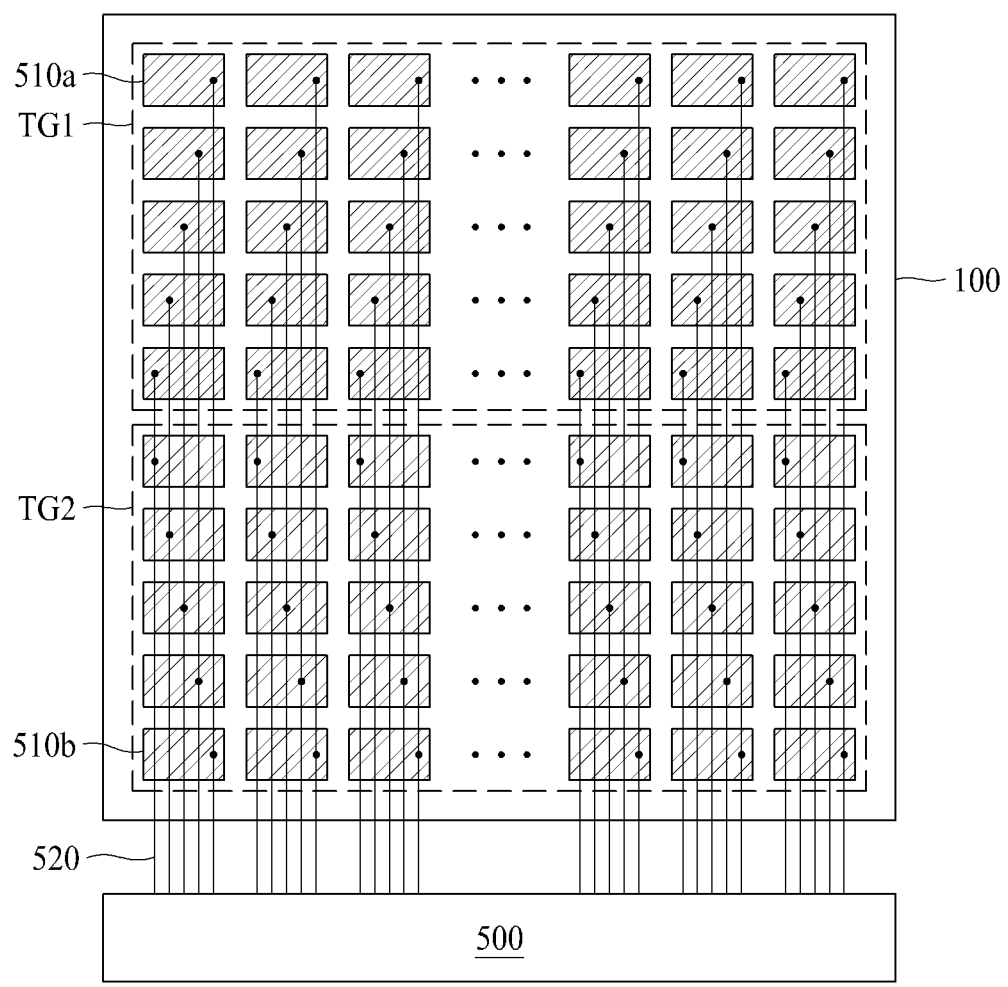

FIG. 4C illustrates a modified example of the light emitting display panel shown in FIG. 4a.

That is, in the light emitting display panel shown in FIG. 4A, the first touch electrode 510a provided on the upmost end of the first touch group TG1 and the second touch electrode 510b provided on the uppermost end of the second touch group TG2 are connected to one touch line 520, and the first touch electrode 510a provided on the lowermost end of the first touch group TG1 and the second touch electrode 510b provided on the lowermost end of the second touch group TG2 are connected to one touch line 520.

However, in the light emitting display panel shown in FIG. 4C, the first touch electrode 510a provided on the uppermost end of the first touch group TG1 and the second touch electrode 510b provided on the lowermost end of the second touch group TG2 are connected to one touch line 520, and the first touch electrode 510a provided on the lowermost end of the first touch group TG1 and the second touch electrode 510b provided on the uppermost end of the second touch group TG2 are connected to one touch line 520.

Figure 5A:
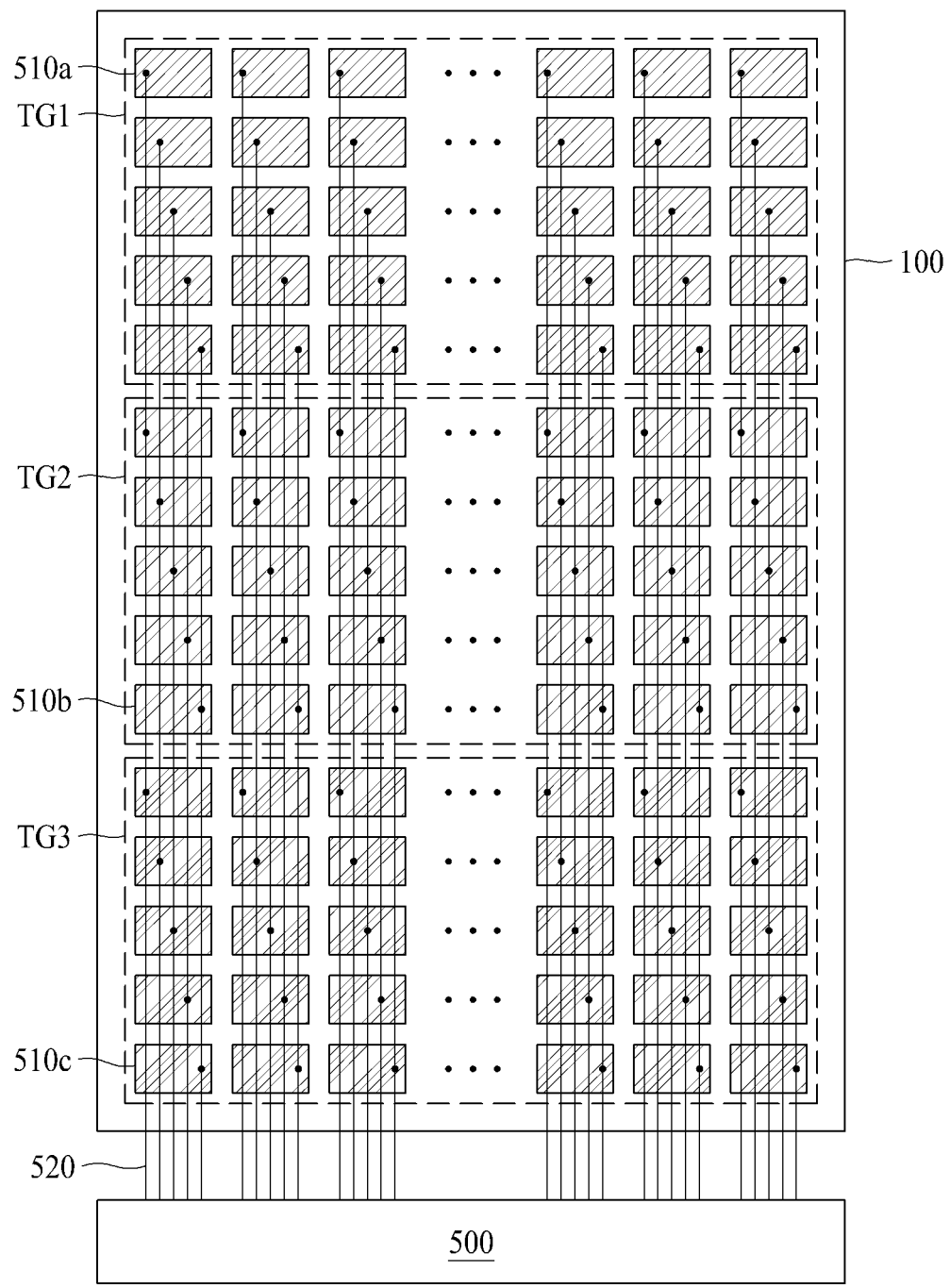

Next, FIG. 5A illustrates a modified example of the light emitting display panel shown in FIG. 4a.

That is, in the light emitting display panel shown in FIG. 5A, three touch electrodes 510 are connected to one touch line 520.

A first touch group TG1 including touch electrodes having the same area as that of the first touch electrode 510a among the three touch electrodes 510, a second touch group TG2 including touch electrodes having the same area as that of the second touch electrode 510b among the three touch electrodes 510 and a third touch group TG3 including touch electrodes having the same area as that of the third touch electrode 510c among the three touch electrodes 510 are separated from one another along the first direction of the substrate.

That is, the first touch group TG1 is provided on the upper end of the light emitting display panel 100 shown in FIG. 5A, the second touch group TG2 is provided on a middle end of the light emitting display panel 100 shown in FIG. 5A, and the third touch group TG3 is provided on the lower end of the light emitting display panel 100 shown in FIG. 5A.

Figure 5B:
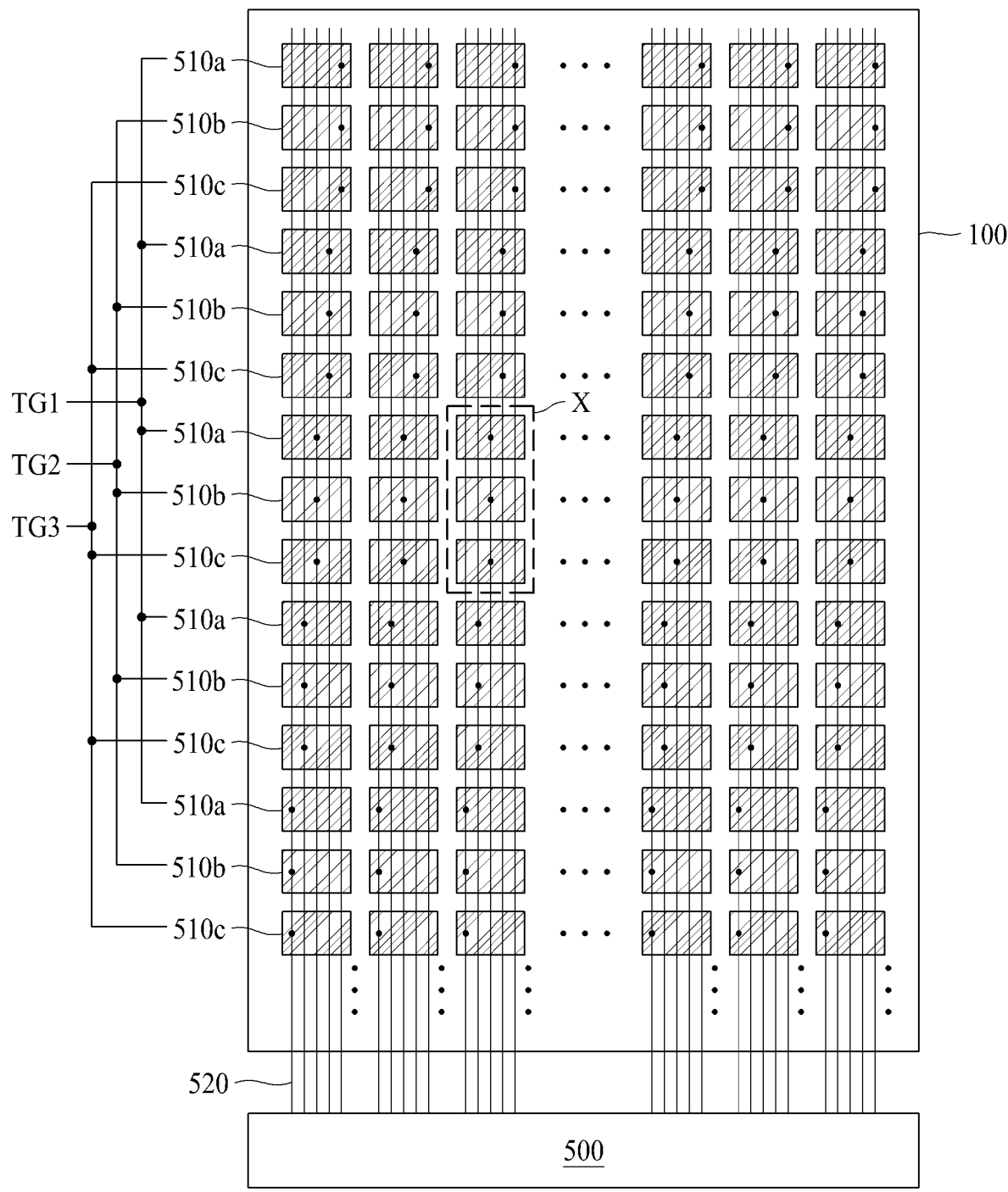

FIG. 5B illustrates a modified example of the light emitting display panel shown in FIG. 4B.

That is, in the light emitting display panel shown in FIG. 5B, three touch electrodes 510 are connected to one touch line 520, and a first touch electrode 510a provided in the first touch group TG1, a second touch electrode 510b provided in the second touch group TG2 and the third touch electrode 510c provided in the third touch group TG3 are alternately provided along the first direction.

In this case, the first touch electrode 510a, the second touch electrode 510b and the third touch electrode 510c, which are adjacent to one another along the first direction, are connected to one touch line 520.

Figure 5C:
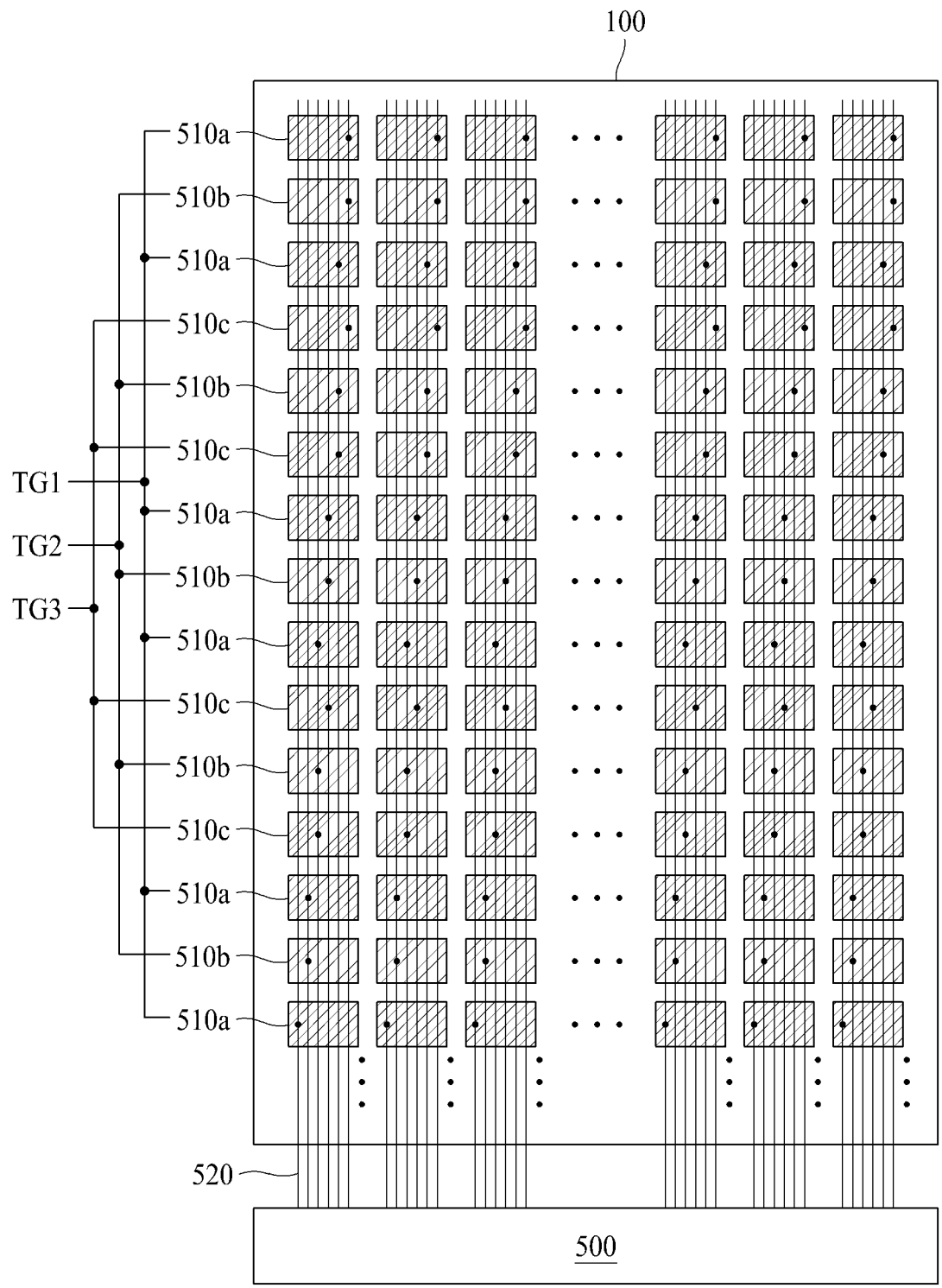

Next, FIG. 5C illustrates a modified example of the light emitting display panel shown in FIG. 5B.

That is, in the light emitting display panel shown in FIG. 5B, the first touch electrode 510a, the second touch electrode 510b and the third touch electrode 510c are adjacent to each other along the first direction, are alternately provided along the first direction, and are connected to one touch line 520.

However, in the light emitting display panel shown in FIG. 5C, the first touch electrode 510a, the second touch electrode 510b, the first touch electrode 510a, the third touch electrode 510c, the second touch electrode 510b, the third touch electrode 510c, the first touch electrode 510a, the second touch electrode 510b, the first touch electrode 510a and the third touch electrode 510c are provided along the first direction. That is, the first touch electrode 510a is provided between the second touch electrode 510a and the third touch electrode 510c. In this case, the first touch electrode 510a, the second touch electrode 510b and the third touch electrode 510c, which are adjacent to one another, are connected to one touch line 520.

Figure 5D:
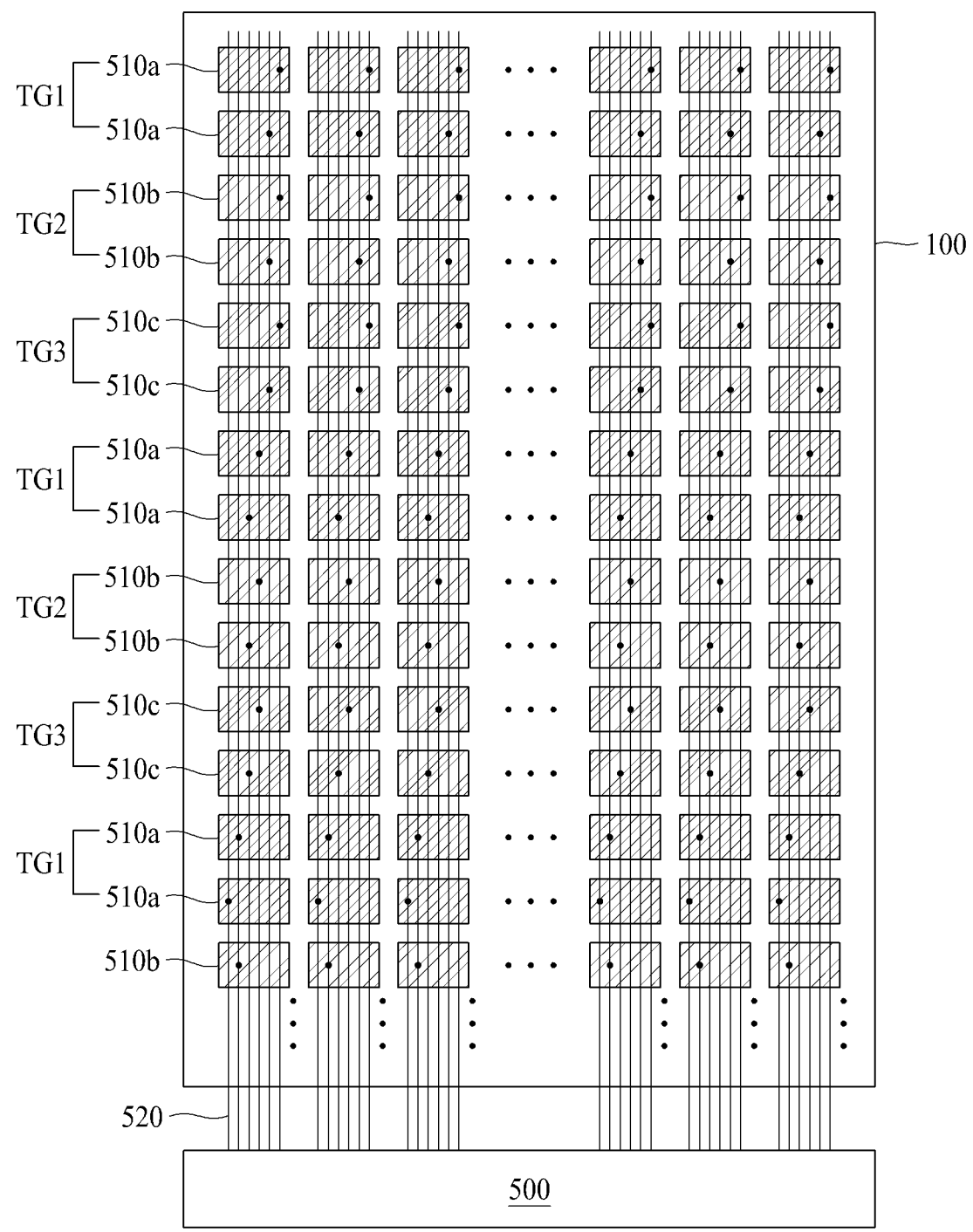

Next, FIG. 5D illustrates a modified example of the light emitting display panel shown in FIG. 5b.

That is, in the light emitting display panel shown in FIG. 5B, the first touch electrode 510a, the second touch electrode 510b and the third touch electrode 510c are adjacent to one another along the first direction, are alternately provided along the first direction, and are connected to one touch line 520.

However, in the light emitting display panel shown in FIG. 5D, the first touch electrode 510a, the first touch electrode 510a, the second touch electrode 510b, the second touch electrode 510b, the third touch electrode 510c, the third touch electrode 510c, the first touch electrode 510a and the first touch electrode 510a are provided along the first direction. That is, two first touch electrodes 510a included in the first touch group TG1, two second touch electrodes 510b included in the second touch group TG2 and two third touch electrodes 510c included in the third touch group TG3 are alternately provided along the first direction. In this case, the first touch electrode 510a, the second touch electrode 510b and the third touch electrode 510c, which are adjacent to one another, are connected to one touch line 520.

Next, FIG. 6A illustrates a modified example of the light emitting display panel shown in FIG. 4a.

That is, in the light emitting display panel shown in FIG. 6A, four touch electrodes 510 are connected to one touch line 520.

A first touch group TG1 including touch electrodes having the same area as that of the first touch electrode 510a among four touch electrodes 510, a second touch group TG2 including touch electrodes having the same area as that of the second touch electrode 510b among the four touch electrodes 510, a third touch group TG3 including touch electrodes having the same area as that of the third touch electrode 510c among the four touch electrodes 510 and a fourth touch group TG4 including touch electrodes having the same area as that of the fourth touch electrode 510d among the four touch electrodes 510 are separated from one another along the first direction of the substrate.

That is, the first touch group TG1 is provided on the upper end of the light emitting display panel 100 shown in FIG. 6A, the second touch group TG2 is provided on a middle upper end of the light emitting display panel 100 shown in FIG. 6a, the third touch group TG3 is provided on a middle lower end of the light emitting display panel 100 shown in FIG. 6A, and the fourth touch group TG4 is provided on the lower end of the light emitting display panel shown in FIG. 6A.

Next, FIG. 6B illustrates a modified example of the light emitting display panel shown in FIG. 4B.

That is, in the light emitting display panel shown in FIG. 6B, four touch electrodes 510 are connected to one touch line 520, a first touch electrode 510a provided in the first touch group TG1, a second touch electrode 510b provided in the second touch group TG2, a third touch electrode 510c disposed on the third touch group TG3 and a fourth touch electrode 510d provided in the fourth touch group TG4 are alternately provided along the first direction.

In this case, the first touch electrode 510a, the second touch electrode 510b, the third touch electrode 510c and the fourth touch electrode 510d, which are adjacent to one another along the first direction, are connected to one touch line 520.

Next, FIG. 6C illustrates a modified example of the light emitting display panel shown in FIG. 6B.

That is, in the light emitting display panel shown in FIG. 6B, the first touch electrode 510*a*, the second touch electrode 510*b*, the third touch electrode 510*c* and the fourth touch electrode 510*d* are adjacent to each other along the first direction, are alternately provided along the first direction and are connected to one touch line 520.

However, in the light emitting display panel shown in FIG. 6C, the first touch electrode 510*a*, the first touch electrode 510*a*, the first touch electrode 510*a*, the second touch electrode 510*b*, the second touch electrode 510*b*, the second touch electrode 510*b*, the third touch electrode 510*c*, the third touch electrode 510*c*, the third touch electrode 510*c*, the first touch electrode 510*a*, the first touch electrode 510*a* and the first touch electrode 510*a* are provided along the first direction. That is, the three first touch electrodes 510*a* included in the first touch group TG1, the three second touch electrodes 510*b* included in the second touch group TG2, the three third touch electrodes 510*c* included in the third touch group TG3 and the four fourth touch electrodes 510*d* included in the fourth touch group TG4 are alternately provided along the first direction. In this case, the first touch electrode 510*a*, the second touch electrode 510*b* and the third touch electrode 510*c* are connected to one touch line 520.

Next, in the light emitting display panel shown in FIG. 7A, each of the touch lines 520 includes a main touch line 520*a* provided along the first direction of the substrate, that is, a vertical direction and an auxiliary touch line 520*b* provided in a second direction different from the first direction, that is, a horizontal direction and connected with the main touch line 520*a*. At least two touch electrodes having their respective areas different from each other are provided along the auxiliary touch line 520*b* and connected to the auxiliary touch line 520*b*.

In particular, in the light emitting display panel shown in FIG. 7A, the two touch electrodes 510*a* and 510*b* having their respective areas different from each other are provided along the auxiliary touch line 520*b*, and the two touch electrodes having their respective areas different from each other are connected to the auxiliary touch line 520*b*.

In this case, touch electrodes of the first touch group having the same area as that of the first touch electrode 510*a* of the two touch electrodes having their respective areas different from each other are provided in the first direction, and touch electrodes of the second touch group having the same area as that of the second touch electrode 510*b* of the two touch electrodes having their respective areas different from each other are provided in parallel with the first touch electrodes 510*a*.

In this case, the first touch electrodes 510*a* and the second touch electrodes 510*b* may alternately be provided along the second direction, but as shown in FIG. 7A, two touch electrodes included in the same touch group may continuously be provided along the second direction.

Next, FIG. 7B illustrates a modified example of the light emitting display panel shown in FIG. 7A.

That is, in the light emitting display panel shown in FIG. 7B, two touch electrodes having their respective areas different from each other are provided along the auxiliary touch line 520*b*, two touch electrodes having their respective areas different from each other are connected to the auxiliary touch line 520*b*, and the auxiliary touch line 520*b* is connected to the main touch line 520*a*.

In this case, in the light emitting display panel shown in FIG. 7B, the touch electrodes 510*a* of the first touch group and the touch electrodes 510*b* of the second touch group are alternately provided along the first direction.

Also, the touch electrodes 510*a* of the first touch group and the touch electrodes 510*b* of the second touch group are alternately provided along the second direction.

Next, FIG. 7C illustrates a modified example of the light emitting display panel shown in FIG. 7A.

That is, in the light emitting display panel shown in FIG. 7A, the touch electrodes 510*a* of the first touch group are provided along the first direction, the touch electrodes 510*b* of the second touch group are also provided along the first direction, and the two touch electrodes included in the same touch group are continuously provided along the second direction.

However, in the light emitting display panel shown in FIG. 7C, the touch electrodes 510*a* of the first touch group are provided along the first direction, the touch electrodes 510*b* of the second touch group are also provided along the first direction, and the first touch electrodes 510*a* and the second touch electrodes 510*b* are alternately provided along the second direction.

Next, FIG. 7D illustrates a modified example of the light emitting display panel shown in FIG. 7A.

That is, in the light emitting display panel shown in FIG. 7A, two touch electrodes having their respective areas different from each other are provided along the auxiliary touch line 520*b*, the two touch electrodes having their respective areas different from each other are connected to the auxiliary touch line 520*b*, and the auxiliary touch line 520*b* is connected to the main touch line 520*a*.

However, in the light emitting display panel shown in FIG. 7D, three touch electrodes 510*a*, 510*b* and 510*c* having their respective areas different from one another are provided along the auxiliary touch line 520*b*, the three touch electrodes 510*a*, 510*b* and 510*c* having their respective areas different from one another are connected to the auxiliary touch line 520*b*, and the auxiliary touch line 520*b* is connected to the main touch line 520*a*.

Next, in the light emitting display panel shown in FIG. 8A, at least two touch electrodes 510*b* and 510*d* having areas different from those of at least two touch electrodes 510*a* and 510*c* connected to the auxiliary touch line 520*b* are provided in another auxiliary touch line 520*b*1 adjacent to the auxiliary touch line 520*b* in the first direction, and the auxiliary touch line 520*b*1 is connected to the main touch line 520*a*.

That is, in the light emitting display panel shown in FIG. 8A, the second touch electrode 510*b* and the fourth touch electrode 510*d*, which have areas different from those of the first touch electrode 510*a* and the third touch electrode 510*c* connected to the auxiliary touch line 520*b*, are provided in another auxiliary touch line 520*b*1 adjacent to the auxiliary touch line 520*b*, and the auxiliary touch line 520*b*1 is connected to the main touch line 520*a*.

Therefore, in the light emitting display panel shown in FIG. 8A, four touch electrodes 510*a*, 510*b*, 510*c* and 510*d* having their respective areas different from one another are connected to one touch line 520.

Next, FIG. 8B illustrates a modified example of the light emitting display panel shown in FIG. 8*a*.

That is, in the light emitting display panel shown in FIG. 8A, two first touch electrodes 510*a* and two third touch electrodes 510*c* are alternately provided along the second direction, and two fourth touch electrodes 510*d* and two second touch electrodes 510*b* are alternately provided.

However, in the light emitting display panel shown in FIG. 8B, the first touch electrode 510*a* and the third touch electrode 510*c* are alternately provided along the second direction, and the fourth touch electrode 510d and the second touch electrode 510b are alternately provided.

Finally, FIG. 8C illustrates a modified example of the light emitting display panel shown in FIG. 8a.

That is, in the light emitting display panel shown in FIG. 8A, two touch electrodes 510a and 510c are connected to the auxiliary touch line 520b, the second touch electrode 510b and the fourth touch electrode 510d are connected to another auxiliary touch line 520b1, and the auxiliary touch line 520b1 is connected to the main touch line 520a.

However, in the light emitting display panel shown in FIG. 8C, three touch electrodes 510a, 510c, 510e are connected to the auxiliary touch line 520b, three touch electrodes 510b, 510d, 510f are connected to another auxiliary touch line 520b1, and the auxiliary touch line 520b1 is connected to the main touch line 520a.

Figure 9:
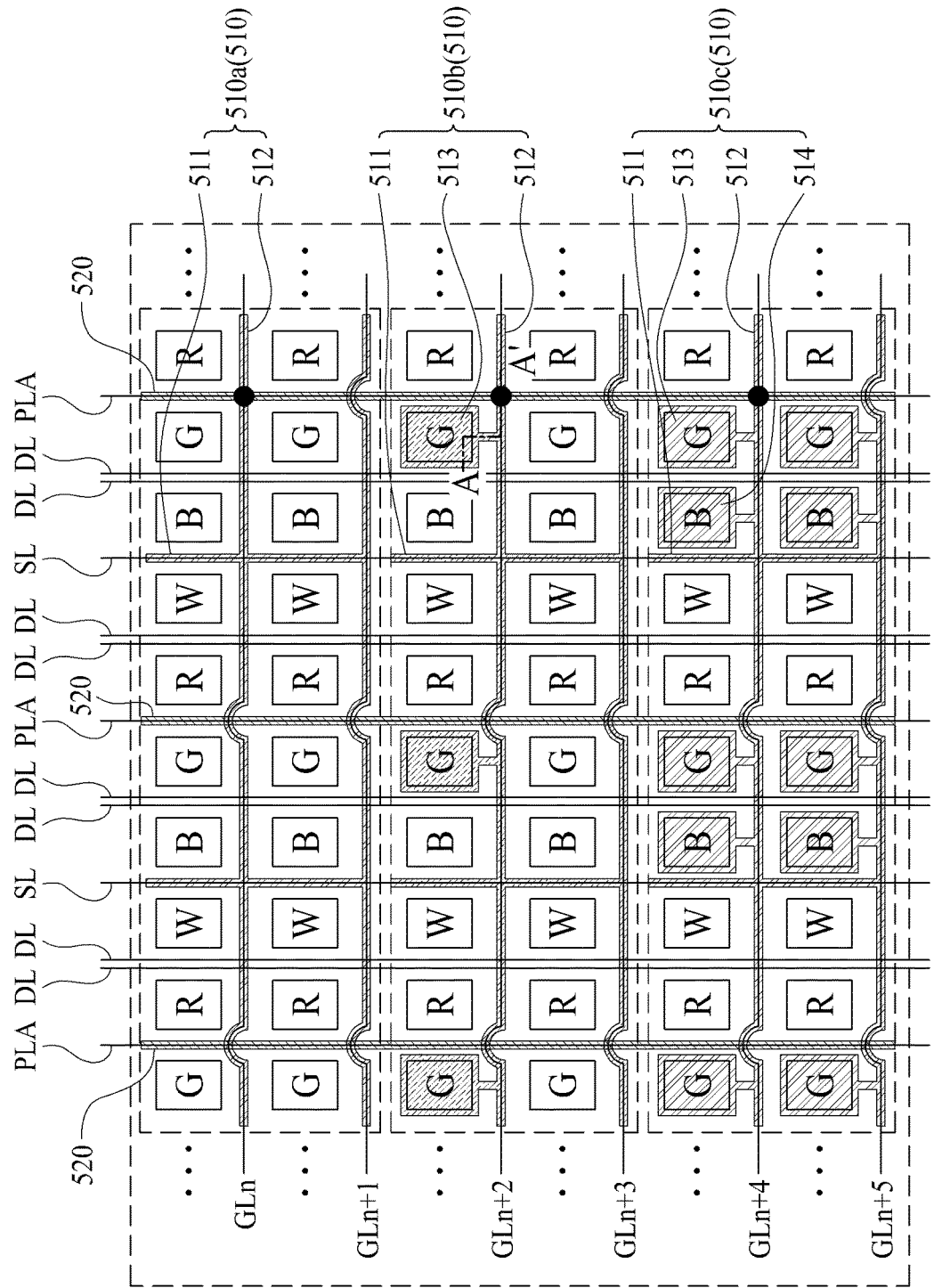
FIG. 9 is an exemplary view illustrating area X shown in FIG. 5B.
Figure 10:
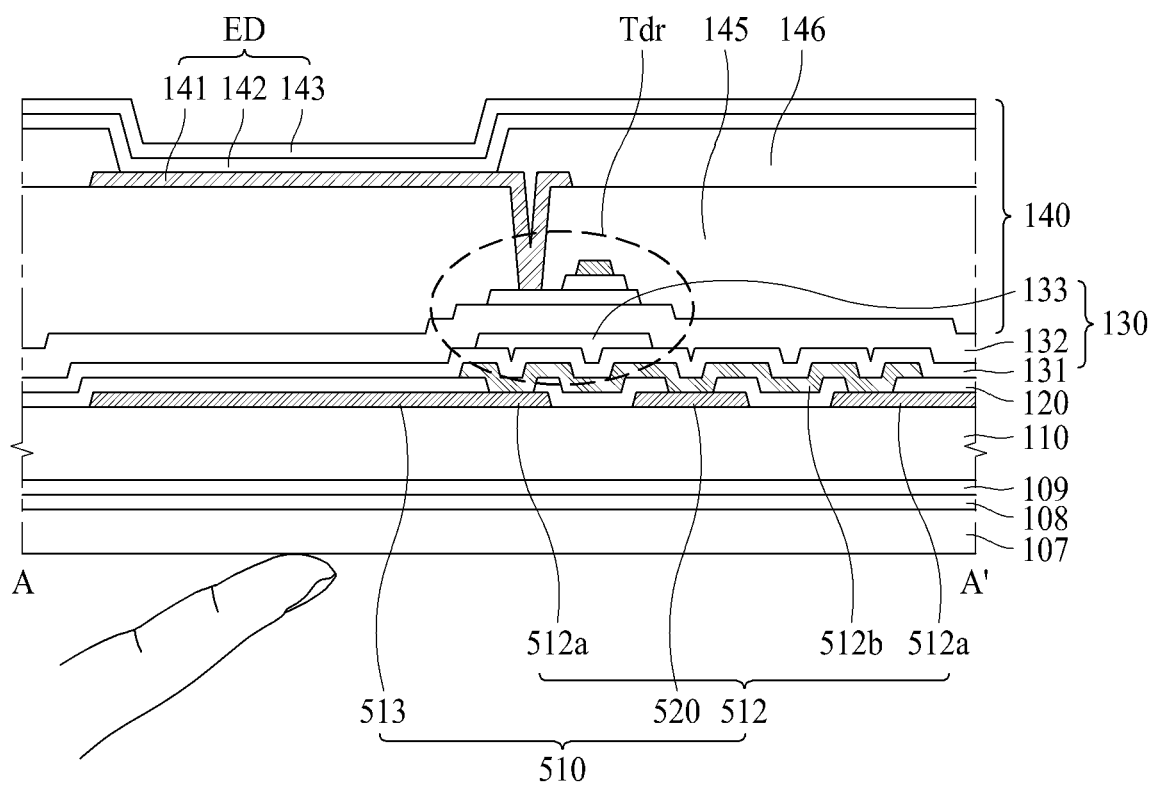
FIG. 10 is an exemplary view illustrating a cross-section taken along line A-A' shown in FIG. 9.

FIG. 9 is an exemplary view illustrating area X shown in FIG. 5B, and FIG. 10 is an exemplary view illustrating a cross-section taken along line A-A' shown in FIG. 9. In the following description, the same or similar description as or to that described with reference to FIGS. 1 to 8 will be omitted or briefly described.

As described above, the light emitting display apparatus according to the present disclosure includes a light emitting display panel 100, a gate driver 200, a data driver 300, a controller 400 and a touch driver 500.

As shown in FIGS. 9 and 10, the light emitting display panel 100 includes a substrate 110, touch electrodes 510 provided on the substrate, touch lines 520 provided on the substrate, a cover layer 130 covering the touch electrodes 510 and the touch lines 520, and a light emitting driving layer 140 disposed on an upper end of the cover layer 130.

The cover layer 130 includes a first cover layer 131 covering the touch electrodes 510 and the touch lines 520, a light shielding layer 133 provided at a position corresponding to the driving transistor Tdr on an upper end of the first cover layer 131, and a second cover layer 132 covering the light shielding layer 133 and the first cover layer 131.

The light emitting driving layer 140 includes a driving transistor Tdr provided on the upper end of the cover layer 130, a planarization layer 145 covering the driving transistor, and a light emitting element ED and a bank 146 provided on an upper end of the planarization layer 145.

The light emitting element ED includes an anode 141 connected with the driving transistor Tdr, a light emitting layer 142 provided on an upper end of the anode, and a cathode 143 disposed on an upper end of the light emitting layer.

The anode 141 is surrounded by the bank 146, and pixels may be divided by the bank 146. In the following description, an area in which the bank 146 is provided in the light emitting display panel will be referred to as a bank area.

As shown in FIG. 10, a polarizing film 109 is attached to the lower end of the substrate 110, and a cover glass 107 is attached to the polarizing film 109 through an adhesive 108.

Light output from the light emitting element ED is output to the outside of the light emitting display apparatus through the substrate 110 and the cover glass 107, and a user's touch occurs in the cover glass 107.

A structure of the touch electrodes 510 and the touch lines 520 is as follows.

As shown in FIG. 9, at least two touch electrodes 510 are connected to one touch line 520, and areas of at least two touch electrodes connected to one touch line 520 are different from each other.

In particular, each of the touch electrodes 510 includes at least one touch electrode lines 511, 512 and 513 provided on the substrate 110, and areas of the touch electrode lines 511, 512, 513 and 514 provided in each of the at least two touch electrodes 510 connected to one touch line 520 are different from one another.

For example, the substrate 110 includes unit pixels, each of the unit pixels includes at least three pixels, and each of the touch lines 520 is provided along a first direction (e.g., vertical direction) of the substrate 110. For convenience of description, as shown in FIG. 9, a light emitting display panel provided with a unit pixel including a red pixel R, a white pixel W, a blue pixel B and a green pixel G will be described as an example of the present disclosure.

That is, in the light emitting display panel shown in FIG. 9, a voltage supply line PLA is provided between the unit pixels, and each of the touch lines 520 is provided in parallel with the voltage supply line PLA between the unit pixels. In this case, the touch line 520 and the voltage supply line PLA are provided in their respective layers different from each other, and are insulated from each other through an insulating layer.

Two data lines DL are provided between the red pixel B and the white pixel W and between the blue pixel B and the green pixel G. A sensing line SL is provided between the white pixel W and the blue pixel B.

Each of the touch electrode 510 may include a first touch electrode line 511 provided on the substrate 110 to overlap a first bank area provided along a first direction (vertical direction) among bank areas between pixels, and a second touch electrode line 512 provided on the substrate 110 to overlap a second bank area provided along a second direction (horizontal direction) different from the first direction among the bank areas between the pixels, wherein the first touch electrode line 511 and the second touch electrode line 512 are connected to each other. The first touch electrode line 511 and the second touch electrode line 512 may be provided in the same layer.

That is, the first touch electrode line 511 may be provided in parallel with the data line DL, and may be provided to overlap the sensing line SL, for example, as shown in FIG. 9. In this case, the first touch electrode line 511 and the sensing line SL are provided in their respective layers different from each other, and are insulated from each other through an insulating layer.

The first touch electrode line 511 and the second touch electrode line 512 are formed in the same layer on the substrate 110. Therefore, the first touch electrode line 511 and the second touch electrode line 512 may be connected to each other.

When two touch electrodes 510 are connected to one touch line 520, each of the first touch electrode 510a and the second touch electrode 510b includes a first touch electrode line 511 and a second touch electrode line 512. The second touch electrode 510b may further include a third touch electrode line 513 provided to correspond to a first pixel G of the pixels constituting the unit pixel, and the third touch electrode line 513 may be connected with the second touch electrode line 512 provided in the second touch electrode 510b. In this case, since the second touch electrode line 512 is connected with the first touch electrode line 511, the third touch electrode line 513 is electrically connected with the first touch electrode line 511. In another aspect, the third touch electrode line 513 may directly be connected with the first touch electrode line 511.

In addition, as shown in FIG. 9, when three touch electrodes 510a, 510b and 510c are connected to one touch line 520, each of the first to third touch electrodes 510a to 510c includes a first touch electrode line 511 and a second touch electrode line 512. The second touch electrode 510b further includes a third touch electrode line 513 provided to correspond to the first pixel G of the pixels constituting the unit pixel. The third touch electrode line 513 is connected with the second touch electrode line 512 provided in the second touch electrode 510b, and the third touch electrode 510c further includes a third touch electrode line 513 provided to correspond to the first pixel G of the pixels constituting the unit pixel and a fourth touch electrode line disposed to correspond to a second pixel B of the pixels constituting the unit pixel, and the third touch electrode line 513 and the fourth touch electrode line 514 are connected with the second touch electrode line 512 provided in the third touch electrode 510c. In this case, since the second touch electrode line 512 is connected with the first touch electrode line 511, the third touch electrode line 513 and the fourth touch electrode line 514 are electrically connected with the first touch electrode line 511. In another aspect, the fourth touch electrode line 514 may directly be connected with the first touch electrode line 511.

The first touch electrode 510a includes a first touch electrode line 511 and a second touch electrode line 512. In this case, an area of the first touch electrode 510a is an area of the first touch electrode line 511 and the second touch electrode line 512.

The second touch electrode 510b includes a first touch electrode line 511, a second touch electrode line 512 and a third touch electrode line 513. In this case, an area of the second touch electrode 510b is an area of the first touch electrode line 511, the second touch electrode line 512 and the third touch electrode line 513.

The third touch electrode 510c includes a first touch electrode line 511, a second touch electrode line 512, a third touch electrode line 513 and a fourth touch electrode line 514. In this case, an area of the third touch electrode 510c is an area of the first touch electrode line 511, the second touch electrode line 512, the third touch electrode line 513 and the fourth touch electrode line 514.

Therefore, the areas of the touch electrode lines respectively provided in the first touch electrode 510a, the second touch electrode 510b and the third touch electrode 510c, which are connected to one touch line 520, are different from one another.

In particular, in the example shown in FIG. 9, the area of the second touch electrode 510b is larger than the area of the first touch electrode 510a, and the area of the third touch electrode 510c is larger than that of the second touch electrode 510b.

In accordance with the above-described method, the areas of the touch electrodes connected to one touch line 520 may be set to be different from each other through various combinations.

As described above, the first touch electrode line 511 may overlap the sensing line SL provided in the unit pixel, and the touch line 520 may overlap the voltage supply line PLA provided in the unit pixel.

Each of the first touch electrode 510a, the second touch electrode 510b and the third touch electrode 510c may include at least one first touch electrode line 511 and at least one second touch electrode line 512.

Each of the second touch electrode 510b and the third touch electrode 510c may include at least one third touch electrode line 513.

The third touch electrode 510c may include at least one fourth touch electrode line 514.

That is, the number of the first touch electrode lines 511, the second touch electrode lines 512, the third touch electrode lines 513 and the fourth touch electrode lines 514, which are provided in one touch electrode 510 may be set diversely.

Also, as shown in FIG. 10, the first touch electrode line 511, the second touch electrode line 512, the third touch electrode line 513 and the touch line 520, which constitute the second touch electrode 510b, are provided on the substrate 110.

In this case, the first touch electrode line 511, the second touch electrode line 512, the third touch electrode line 513 and the touch line 520 are covered by a first passivation layer 120.

Particularly, as shown in FIG. 10, the second touch electrode line 512 includes second main touch electrode lines 512a provided along the second direction on the substrate 110 and separated from each other using the touch line 520 as a boundary, and a second connection touch electrode line 512b provided to overlap with the touch line 520 of the first passivation layer 120.

In this case, the second connection touch electrode line 512b constituting at least one of the second touch electrode lines 512 constituting the second touch electrode 510b is connected with the touch line 520 through a contact hole formed in the first passivation layer 120. Therefore, the second touch electrode 510b may be connected to the touch line 520.

The first touch electrode 510a and the third touch electrode 510c may be connected with the touch line 520 through the same method as the second touch electrode 510b.

According to the present disclosure described as above, the touch electrodes 510 having different areas may be connected to one touch line 520. In this case, the touch driver 500 may distinguish whether there is a touch on a touch electrode and the touch electrode 510 where a touch has occurred, through touch signals of different sizes, which are generated by different areas. Therefore, according to the present disclosure, even though the number of touch electrodes 510 is increased, the number of touch lines 520 may not be increased. Therefore, an aperture ratio of the light emitting display panel may be improved.

In addition, according to the present disclosure, the third touch electrode line 513 and the fourth touch electrode line 514 may be formed in the area corresponding to the pixel. Therefore, the size of the touch signal may be increased and thus touch sensitivity may be improved.

Also, according to the present disclosure, even though the number of touch electrodes is increased, the number of touch lines may not be increased. Therefore, parasitic capacitance between the electrodes and the touch lines provided in the light emitting display panel may be reduced, whereby quality of the light emitting display apparatus may be improved.

According to the present disclosure, the following advantageous effects may be obtained. According to the present disclosure, even though the number of touch electrodes is increased, the number of touch lines may be minimized. Therefore, parasitic capacitance between the electrodes and the touch lines, which are provided in the light emitting display panel, may be reduced, and thus quality of the light emitting display apparatus may be improved.

It will be apparent to those skilled in the art that the present disclosure described above is not limited by the above-described aspects and the accompanying drawings and that various substitutions, modifications and variations can be made in the present disclosure without departing from the spirit or scope of the disclosures. Consequently, the scope of the present disclosure is defined by the accompanying claims and it is intended that all variations or modifications derived from the meaning, scope and equivalent concept of the claims fall within the scope of the present disclosure.

What is claimed is:

1. A light emitting display apparatus comprising:
a substrate;
touch electrodes provided on the substrate;
touch lines provided on the substrate;
a cover layer covering the touch electrodes and the touch lines;
a light emitting driving layer provided on an upper end of the cover layer; and
a touch driver connected with the touch lines,
wherein at least two touch electrodes are connected to one touch line, and areas of the at least two touch electrodes are different from each other; and
wherein, when the same touch driving voltage is supplied to the at least two touch electrodes, a size of a touch signal from the at least two touch electrodes corresponds to touch input in the at least two touch electrodes, and
wherein each of the touch electrodes includes touch electrode lines provided on the substrate, and areas of the touch electrode lines provided in each of the at least two touch electrodes connected to one touch line are different from each other.

2. The light emitting display apparatus of claim 1, wherein the substrate is provided with unit pixels,
each of unit pixel of the unit pixels includes at least three sub-pixels,
each of the touch lines is provided along a first direction of the substrate,
each of the touch lines is provided between the unit pixels,
each of the touch electrodes includes:
a first touch electrode line provided on the substrate to overlap with a first bank area provided along the first direction among bank areas between the unit pixels; and
a second touch electrode line provided on the substrate to overlap with a second bank area provided along a second direction different from the first direction among the bank areas between the unit pixels, and
wherein the first touch electrode line and the second touch electrode line are connected to each other.

3. The light emitting display apparatus of claim 2, wherein, when a first touch electrode and a second touch electrode are connected to one touch line, each of the first touch electrode and the second touch electrode includes the first touch electrode line and the second touch electrode line,
wherein the second touch electrode further includes a third touch electrode line provided to correspond to a first sub-pixel among the at least three sub-pixels constituting the unit pixel, and the third touch electrode line is connected with the second touch electrode line provided in the second touch electrode.

4. The light emitting display apparatus of claim 2, wherein, when a first touch electrode, a second touch electrode, and a third touch electrode are connected to one touch line, each of the first touch electrode and the third touch electrode includes the first touch electrode line and the second touch electrode line,
wherein the second touch electrode further includes a third touch electrode line provided to correspond to a first sub-pixel among the at least three sub-pixels constituting the unit pixel, the third touch electrode line being connected with the second touch electrode line provided in the second touch electrode, and
wherein the third touch electrode further includes the third touch electrode line provided to correspond to the first sub-pixel among the at least three sub-pixels constituting the unit pixel, and a fourth touch electrode line provided to correspond to a second pixel among the at least three sub-pixels constituting the unit pixel, the third and fourth touch electrode lines being connected to the second touch electrode line provided in the third touch electrode.

5. The light emitting display apparatus of claim 3, wherein the first touch electrode line, the second touch electrode line, the third touch electrode line and the touch line, which constitute the second touch electrode, are provided on the substrate,
wherein the first touch electrode line, the second touch electrode line, the third touch electrode line and the touch line are covered by a first passivation layer,
wherein the second touch electrode line includes:
second main touch electrode lines provided on the substrate along the second direction and separated from each other using the touch line as a boundary; and
a second connection touch electrode line overlapping with the touch line of the first passivation layer,
wherein the second connection touch electrode line is connected with the touch line through a contact hole formed in the first passivation layer.

6. The light emitting display apparatus of claim 2, wherein the touch electrodes having a same area as that of a first touch electrode of the at least two touch electrodes include a first touch group and the touch electrodes having a same area as that of a second touch electrode of the at least two touch electrodes include a second touch group and are separated from each other along the first direction of the substrate, and
wherein the touch line is provided along the first direction.

7. The light emitting display apparatus of claim 2, wherein touch electrodes having a same area as that of a first touch electrode of the at least two touch electrodes and touch electrodes having a same area as that of a second touch electrode of the at least two touch electrodes are alternately provided along the first direction of the substrate.

8. The light emitting display apparatus of claim 1, wherein each of the touch lines includes:
a main touch line provided along a first direction of the substrate; and
an auxiliary touch line provided along a second direction different from the first direction and connected with the main touch line, and
at least two auxiliary touch electrodes having their respective areas different from each other are provided along the auxiliary touch line and are connected to the auxiliary touch line.

9. The light emitting display apparatus of claim 8, wherein at least two additional touch electrodes having areas different from those of the at least two auxiliary touch electrodes are provided in another auxiliary touch line adjacent to the auxiliary touch line, and the another auxiliary touch line is connected to the main touch line.

10. The light emitting display apparatus of claim 1, wherein the touch driver determines a touch electrode of the at least two touch electrodes, to which a touch signal is supplied, and determines whether there is a touch on the touch electrode, by using a size of the touch signal transmitted through the touch line.

11. A light emitting display apparatus comprising:
a substrate;
a plurality of unit pixels including at least three pixels and disposed on the substrate;
first, second and third touch electrodes disposed on the substrate;
first and second touch lines disposed on the substrate;
a cover layer covering the first, second and third touch electrodes and the first and second touch lines;
a light emitting driving layer disposed on the cover layer; and
a touch driver connected with the first and second touch lines and configured to identify touch on the first, second and third touch electrodes by using a size of a touch signal transmitted through the first and second touch lines,
wherein at least two of the first, second and third touch electrodes are connected to one of the first and second touch lines,
wherein the second touch electrode has an area greater than the first touch electrode, and the third touch electrode has an area greater than the second touch electrode,
wherein the first touch line overlaps with a sensing line disposed in the plurality of unit pixels, and
wherein each of the first and second touch lines includes:
a main touch line disposed along a first direction of the substrate; and
an auxiliary touch line provided along a second direction different from the first direction and connected with the main touch line, and at least two of the first, second and third touch electrodes having their areas different from one another and connected to the auxiliary touch line.

12. The light emitting display apparatus of claim 11, wherein the first touch electrode includes the first and second touch electrode lines, the second touch electrode includes the first and second touch electrode lines and a third touch electrode line, and the third touch electrode includes the first, second, and third touch electrode lines and a fourth touch electrode line.

13. The light emitting display apparatus of claim 11, wherein the at least two of the first, second and third touch electrodes having areas different from those of at least two auxiliary touch electrodes connected to the auxiliary touch line are provided in another auxiliary touch line adjacent to the auxiliary touch line, and the another auxiliary touch line is connected to the main touch line.

14. The light emitting display apparatus of claim 11, further comprising a passivation layer covering the first touch electrode line, the second touch electrode line, the third touch electrode line, and the fourth touch electrode line.

* * * * *